United States Patent
Morita et al.

(10) Patent No.: US 7,618,605 B2
(45) Date of Patent: Nov. 17, 2009

(54) EXHAUST EMISSION CONTROL DEVICE AND METHOD FOR INTERNAL COMBUSTION ENGINE, AND ENGINE CONTROL UNIT

(75) Inventors: Tomoko Morita, Saitama-ken (JP); Norio Suzuki, Saitama-ken (JP); Hiroshi Ohno, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 167 days.

(21) Appl. No.: 11/984,743

(22) Filed: Nov. 21, 2007

(65) Prior Publication Data

US 2008/0131346 A1 Jun. 5, 2008

(30) Foreign Application Priority Data

Nov. 24, 2006 (JP) .............................. 2006-317854

(51) Int. Cl.
| | |
|---|---|
| B01D 53/56 | (2006.01) |
| B01D 53/94 | (2006.01) |
| F01N 3/10 | (2006.01) |
| F01N 3/18 | (2006.01) |

(52) U.S. Cl. .............. 423/213.2; 423/213.7; 423/239.1; 423/DIG. 5; 60/272; 60/273; 60/274; 60/276; 60/282; 60/299; 422/105; 422/108; 422/110; 422/111; 700/266; 700/274; 700/102

(58) Field of Classification Search .................... 60/272, 60/273, 274, 276, 282, 299; 423/213.2, 213.7, 423/239.1, DIG. 5; 422/105, 108, 110, 111; 700/266, 274, 102

See application file for complete search history.

(56) References Cited

U.S. PATENT DOCUMENTS

| 6,470,673 | B1 * | 10/2002 | van Nieuwstadt et al. ..... 60/274 |
| 2008/0120963 | A1 * | 5/2008 | Morita et al. ................. 60/276 |
| 2008/0120965 | A1 * | 5/2008 | Morita et al. ................. 60/286 |
| 2008/0306631 | A1 * | 12/2008 | Huang ........................ 700/271 |
| 2009/0084087 | A1 * | 4/2009 | Odajima et al. ............... 60/287 |

* cited by examiner

Primary Examiner—Timothy C Vanoy
(74) Attorney, Agent, or Firm—Arent Fox LLP.

(57) ABSTRACT

An exhaust emission control device for an internal combustion engine, which is capable of supplying a just enough amount of reducing agent to a NOx catalyst, thereby reducing exhaust emission and improving fuel economy. The device includes a three-way catalyst, a NOx catalyst provided downstream of the three-way catalyst, and an ECU. The ECU carries out rich spike control such that exhaust gases flowing into the NOx catalyst form a reducing atmosphere. During the control, the ECU calculates a reducing agent consumption amount of reducing agent in the exhaust gases consumed by the three-way catalyst, calculates a cumulative reducing agent amount as a total amount of reducing agent supplied to the NOx catalyst, depending on the reducing agent consumption amount, and terminates the control when the cumulative reducing agent amount becomes larger than a predetermined value.

15 Claims, 12 Drawing Sheets

F I G. 5
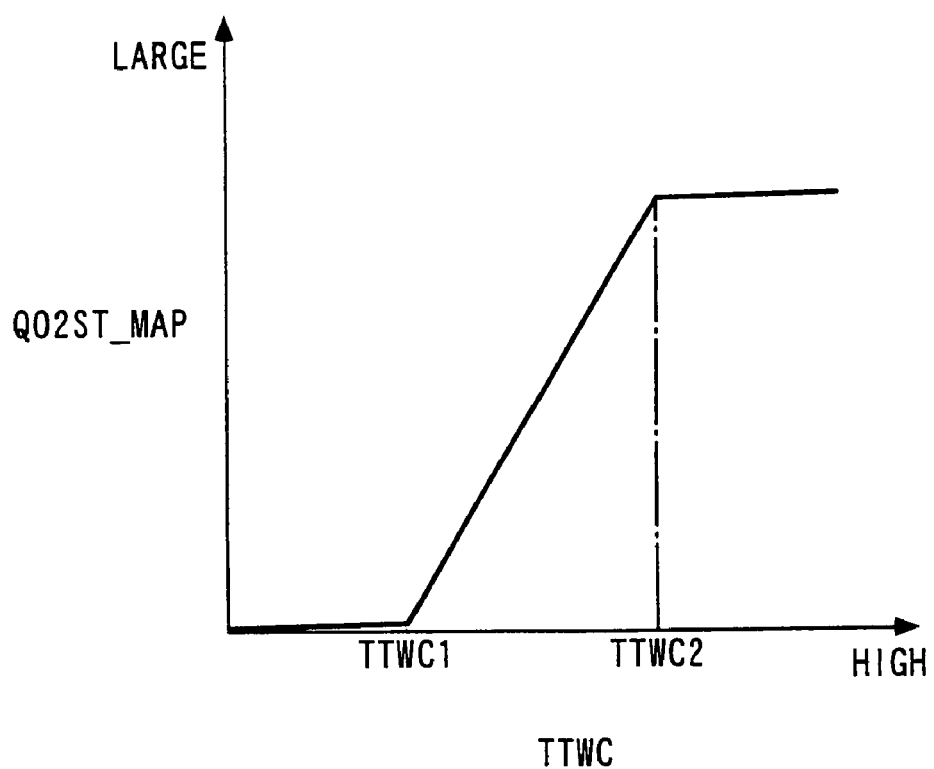

F I G. 1 0
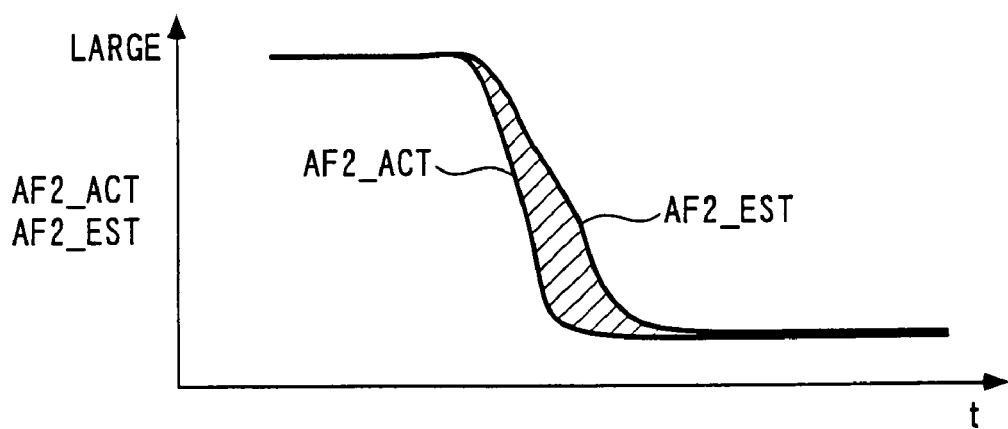
F I G. 1 1
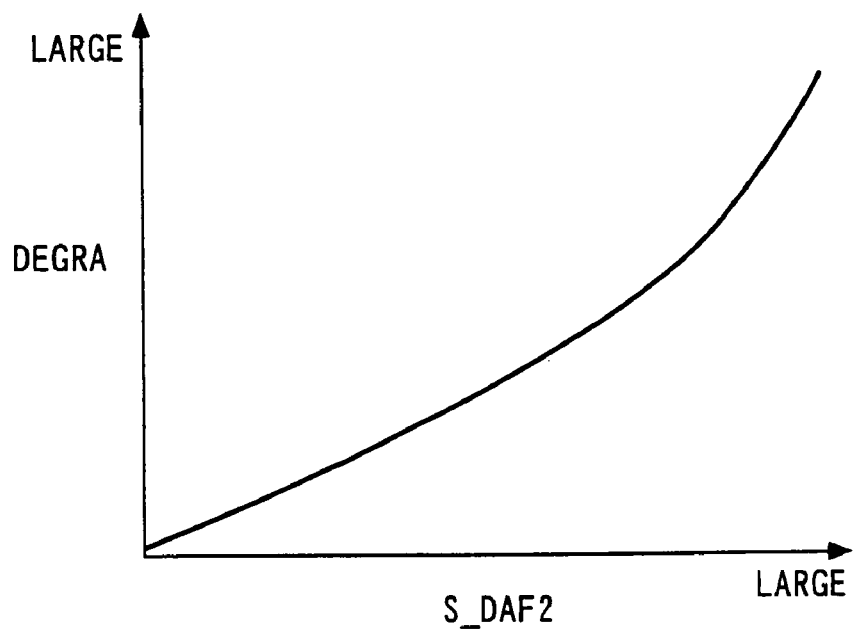

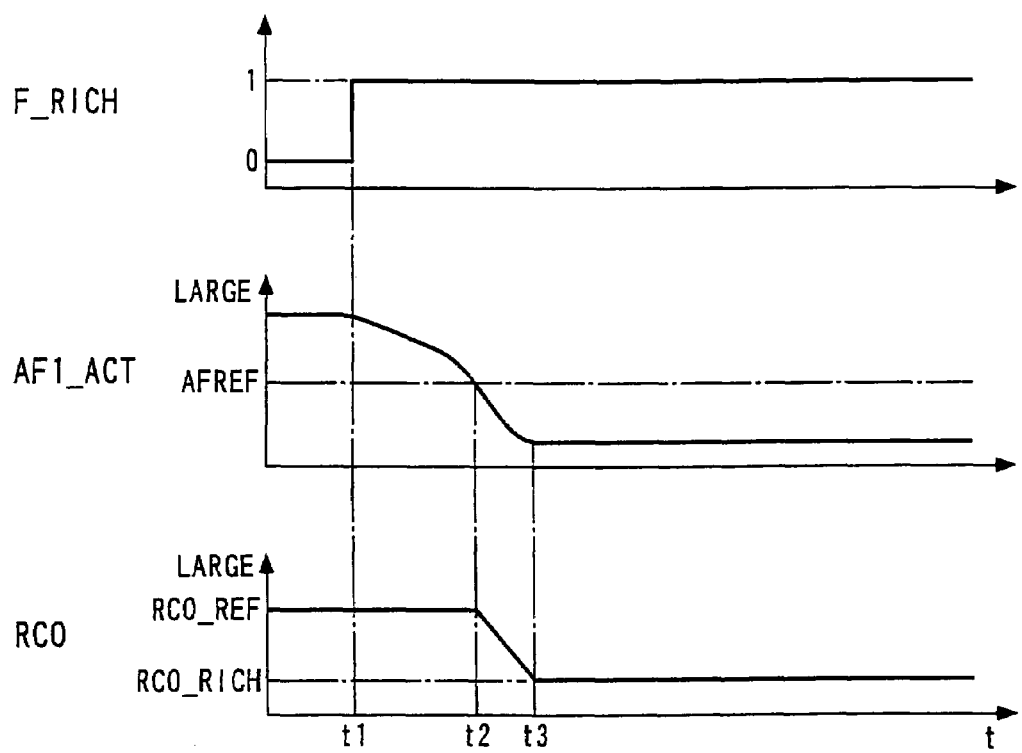

EXHAUST EMISSION CONTROL DEVICE AND METHOD FOR INTERNAL COMBUSTION ENGINE, AND ENGINE CONTROL UNIT

BACKGROUND OF THE INVENTION

1. Field of the Invention

The present invention relates to an exhaust emission control device and method for an internal combustion engine, including an exhaust passage, a NOx catalyst disposed in the exhaust passage for reducing trapped NOx in a reducing atmosphere, and a catalyst which is disposed at a location upstream of the NOx catalyst and has an oxidation function, and an engine control unit, the engine the exhaust emission control device and method and the engine control unit causing reducing agent to be supplied to the upstream side of the catalyst, so as to cause the NOx catalyst to carry out a NOx reducing operation.

2. Description of the Related Art

Conventionally, as an exhaust emission control device of this kind, the present assignee has already proposed an exhaust emission control device disclosed in Japanese Laid-Open Patent Publication (Kokai) No. 2006-207487. This exhaust emission control device is applied to a diesel engine that has a three-way catalyst and a NOx catalyst provided in an exhaust passage at respective locations from upstream to downstream in the mentioned order. The three-way catalyst purifies i.e. decreases exhaust emissions by an oxidizing action and a reducing action. The NOx catalyst traps NOx (nitrogen oxide) contained in a lean atmosphere of exhaust gases, and performs reduction of the trapped NOx when a rich atmosphere of exhaust gases is supplied, thereby purifying the exhaust gases. Further, the exhaust emission control device includes an air-fuel ratio sensor disposed in the exhaust passage at a location upstream of the three-way catalyst, for detecting the air-fuel ratio of exhaust gases.

Normally, the diesel engine is operated under lean conditions, and during the lean operation of the engine, NOx contained in exhaust gases pass through the three-way catalyst to be trapped by the NOx catalyst. During the lean operation, the exhaust emission control device calculates an amount S_QNOx of trapped NOx, which is the total amount of NOx trapped in the NOx catalyst, and calculates a reference value S_QNOxREF for use in comparison with the amount S_QNOx of trapped NOx, based on the amount S_QNOx of trapped NOx, the temperature of the three-way catalyst, and the space velocity of exhaust gases. When S_QNOx≧S_QNOxREF holds, to supply reducing agent (HC and CO) to the NOx catalyst to thereby reduce NOx trapped in the NOx catalyst, rich spike control is carried out in which the air-fuel ratio of a mixture is controlled to a richer value than a stoichiometric air-fuel ratio.

During the rich spike control, the total amount of reducing agent supplied to the NOx catalyst is calculated as a cumulative value S_QDA of the amount of reducing agent, based on a signal indicative of the air-fuel ratio detected by the air-fuel ratio sensor, and a reference value S_QDAREF for comparison with the cumulative value S_QDA is calculated based on the reference value S_QNOxREF. When S_QDA>S_QDAREF holds, it is determined that all the NOx trapped in the NOx catalyst has been reduced, and the rich spike control is terminated.

According to the conventional exhaust emission control device described above, during the rich spike control, reducing agent contained in exhaust gases can be consumed by the oxidizing action of oxygen stored in the three-way catalyst. In this case, the exhaust emission control device calculates the cumulative value S_QDA of the amount of reducing agent based on the signal from the air-fuel ratio sensor upstream of the three-way catalyst, and hence the calculation accuracy of the cumulative value S_QDA is lowered due to consumption of the reducing agent by the oxygen stored in the three-way catalyst, which can cause improper timing for terminating the rich spike control. For example, when the timing for terminating the rich spike control is made earlier than the timing in which the NOx reducing operation of the NOx catalyst is terminated, the rich spike control is executed in spite of termination of the NOx reducing operation of the NOx catalyst. This causes the concentrations of HC and CO in exhaust gases to be held high, resulting in increased exhaust emissions and degraded fuel economy. Inversely, when the timing for terminating the rich spike control is earlier than the timing in which the NOx reducing operation of the NOx catalyst is terminated, NOx trapped in the NOx catalyst is not sufficiently reduced, which causes insufficient NOx trapping performance of the NOx catalyst, resulting in increased exhaust emissions.

SUMMARY OF THE INVENTION

It is an object of the present invention to provide an exhaust emission control device and method and an engine control unit which are capable of supplying a just enough amount of reducing agent to a NOx catalyst while causing the amount of reducing agent consumed by a catalyst upstream of the NOx catalyst to be reflected on required calculations, thereby making it possible to ensure excellent levels of exhaust emission reduction performance and fuel economy improvement performance.

To attain the above object, in a first aspect of the present invention, there is provided an exhaust emission control device for an internal combustion engine, including an upstream catalyst that is disposed in an exhaust passage of the engine, and has an oxidation function as well as purifies exhaust gases, a NOx catalyst that is disposed in the exhaust passage at a location downstream of the upstream catalyst, for trapping NOx contained in an oxidizing atmosphere of exhaust gases, and reducing the trapped NOx by being supplied with a reducing atmosphere of exhaust gases containing reducing agent to thereby purify the trapped NOx, and reduction control means for carrying out reduction control in which the reducing agent is supplied to an upstream side of the upstream catalyst to thereby control the exhaust gases flowing into the NOx catalyst to the reducing atmosphere so as to cause the NOx catalyst to carry out a NOx reducing operation, wherein the reduction control means comprises reducing agent consumption amount-calculating means for calculating an amount of the reducing agent in the exhaust gases consumed by the upstream catalyst during execution of the reduction control, as a reducing agent consumption amount, cumulative reducing agent amount-calculating means for calculating a total amount of the reducing agent supplied to the NOx catalyst during the execution of the reduction control, as a cumulative reducing agent amount, according to the calculated reducing agent consumption amount, and reduction control-terminating means for terminating the reduction control when the calculated cumulative reducing agent amount exceeds a predetermined value during the execution of the reduction control.

With the configuration of this exhaust emission control device according to the first aspect of the present invention, to cause the NOx catalyst to carry out a NOx reducing operation, the reduction control is carried out which controls the exhaust gases flowing into the NOx catalyst to the reducing atmosphere by supplying the reducing agent to an upstream side of the upstream catalyst. During execution of the reduction control, the amount of the reducing agent contained in the exhaust gases and consumed by the upstream catalyst is calculated as the reducing agent consumption amount, and according to the reducing agent consumption amount, the total amount of the reducing agent supplied to the NOx catalyst is calculated as the cumulative reducing agent amount. Therefore, differently from the conventional exhaust emission control device, it is possible to calculate the cumulative reducing agent amount as the total amount of the reducing agent actually supplied to the NOx catalyst, while causing the amount of reducing agent consumed by the catalyst upstream of the NOx catalyst to be reflected on required calculations. Further, when the thus calculated cumulative reducing agent amount exceeds the predetermined value, the reduction control is terminated. This makes it possible to supply a just enough amount of reducing agent to the NOx catalyst based on the cumulative reducing agent amount, which is the total amount of the reducing agent actually supplied to the NOx catalyst, thereby making it possible to ensure excellent levels of exhaust emission reduction performance and fuel economy improvement performance.

Preferably, the exhaust emission control device further comprises air-fuel ratio-detecting means disposed in the exhaust passage at a location upstream of the upstream catalyst, for detecting an air-fuel ratio of the exhaust gases in the exhaust passage as an actual air-fuel ratio, and the reducing agent consumption amount-calculating means calculates the reducing agent consumption amount according to the actual air-fuel ratio.

When the reduction control is carried out as in the case of the exhaust emission control device, the supply of reducing agent to the upstream catalyst change the air-fuel ratio of exhaust gases to a richer side, so that the amount of reducing agent contained in exhaust gases and consumed by the upstream catalyst also changes. However, with the configuration of the preferred embodiment, the reducing agent consumption amount is calculated according to the air-fuel ratio of exhaust gases on the upstream side of the upstream catalyst in the exhaust passage, whereby it is possible to calculate the reducing agent consumption amount, while causing the state of the air-fuel ratio of exhaust gases on the upstream side of the upstream catalyst to be reflected on the calculation. This makes it possible to improve the calculation accuracy of the reducing agent consumption amount, thereby making it possible to improve the accuracy of supplying reducing agent to the NOx catalyst.

More preferably, the reducing agent consumption amount-calculating means switches methods for calculating the reducing agent consumption amount according to a result of comparison between the actual air-fuel ratio and the predetermined value.

When the reduction control is carried out as in the case of the exhaust emission control device to supply reducing agent to the upstream catalyst, the air-fuel ratio of exhaust gases changes to the richer side. During the process of the change of the air-fuel ratio, insofar as exhaust gases supplied to the upstream catalyst has a high concentration of oxygen remaining therein, almost all the reducing agent in the exhaust gases is consumed by oxidation reaction with the remaining oxygen. However, after the air-fuel ratio of the exhaust gases has changed to a value not larger than a predetermined value close to the stoichiometric air-fuel ratio, the concentration of the remaining oxygen in the exhaust gases lowers, so that a considerable amount of the reducing agent is also consumed by oxidation reaction with oxygen stored in the upstream catalyst. With the configuration of the preferred embodiment, the predetermined value for comparison with the actual air-fuel ratio is set to a predetermined value close to the stoichiometric air-fuel ratio, and the methods for calculating the reducing agent consumption amount are switched according to the result of comparison between the actual air-fuel ratio and the predetermined value. This makes it possible to calculate the reducing agent consumption amount as a value which properly represents the total amount of reducing agent actually consumed by the oxidation reaction with the oxygen stored in the upstream catalyst, thereby making it possible to improve the calculation accuracy of the reducing agent consumption amount. This makes it possible to improve the accuracy of supplying the reducing agent to the NOx catalyst.

Preferably, the reducing agent consumption amount-calculating means further comprises oxygen storage amount-calculating means for calculating an amount of oxygen stored in the upstream catalyst as an oxygen storage amount, and calculates the reducing agent consumption amount such that the reducing agent consumption amount takes a larger value as the calculated oxygen storage amount is larger.

With the configuration of the preferred embodiment, the reducing agent consumption amount is calculated to be a larger value as the oxygen storage amount of the upstream catalyst is larger, and therefore the reducing agent consumption amount can be calculated as a value which properly represents the total amount of reducing agent actually consumed by the oxidation reaction with the oxygen stored in the upstream catalyst, based on the oxygen storage amount of the upstream catalyst. This makes it possible to further improve the calculation accuracy of the reducing agent consumption amount, thereby making it possible to further improve the accuracy of supplying the reducing agent to the NOx catalyst.

Preferably, the reducing agent consumption amount-calculating means further comprises degradation degree-calculating means for calculating a degree of degradation of the upstream catalyst, and correction means for correcting the reducing agent consumption amount depending on the calculated degree of degradation.

When the exhaust emission control device includes the upstream catalyst as in the case of the present exhaust emission control device, the amount of reducing agent consumed by the oxidation reaction in the upstream catalyst varies with the degree of degradation of the upstream catalyst. With the configuration of the preferred embodiment, by using the reducing agent consumption amount corrected according to the degree of degradation of the upstream catalyst, it is possible to calculate the reducing agent consumption amount, while causing the degree of degradation of the upstream catalyst to be reflected on calculation. This makes it possible to further improve the calculation accuracy of the reducing agent consumption amount, thereby making it possible to further improve the accuracy of supplying the reducing agent to the NOx catalyst.

To attain the object, in a second aspect of the present invention, there is provided a method of controlling exhaust emissions from an internal combustion engine including an exhaust passage, an upstream catalyst that is disposed in the exhaust, passage of the engine, and has an oxidation function as well as purifies exhaust gases, and a NOx catalyst that is disposed in the exhaust passage at a location downstream of the upstream catalyst, for trapping NOx contained in an oxidizing atmosphere of exhaust gases, and reducing the trapped NOx by being supplied with a reducing atmosphere of exhaust gases containing reducing agent to thereby purify the trapped NOx, wherein reduction control is carried out in which the reducing agent is supplied to an upstream side of the upstream catalyst to thereby control the exhaust gases flowing into the NOx catalyst to the reducing atmosphere so as to cause the NOx catalyst to carry out a NOx reducing operation, the method comprising a reducing agent consumption amount-calculating step of calculating an amount of the reducing agent in the exhaust gases consumed by the upstream catalyst during execution of the reduction control, as a reducing agent consumption amount, a cumulative reducing agent amount-calculating step of calculating a total amount of the reducing agent supplied to the NOx catalyst during the execution of the reduction control, as a cumulative reducing agent amount, according to the calculated reducing agent consumption amount, and a reduction control-terminating step of terminating the reduction control when the calculated cumulative reducing agent amount exceeds a predetermined value during the execution of the reduction control.

With the configuration of the second aspect of the present invention, it is possible to obtain the same advantageous effects as provided by the first aspect of the present invention.

Preferably, the engine includes an air-fuel ratio-detecting means disposed in the exhaust passage at a location upstream of the upstream catalyst, for detecting an air-fuel ratio of the exhaust gases in the exhaust passage as an actual air-fuel ratio, and the reducing agent consumption amount-calculating step include calculating the reducing agent consumption amount according to the actual air-fuel ratio.

More preferably, the reducing agent consumption amount-calculating step includes switching methods for calculating the reducing agent consumption amount according to a result of comparison between the actual air-fuel ratio and the predetermined value.

Preferably, the reducing agent consumption amount-calculating step further comprises an oxygen storage amount-calculating step of calculating an amount of oxygen stored in the upstream catalyst as an oxygen storage amount, and includes calculating the reducing agent consumption amount such that the reducing agent consumption amount takes a larger value as the calculated oxygen storage amount is larger.

Preferably, the reducing agent consumption amount-calculating step further comprises a degradation degree-calculating step of calculating a degree of degradation of the upstream catalyst, and a correction step of correcting the reducing agent consumption amount depending on the calculated degree of degradation.

With the configurations of these preferred embodiments, it is possible to obtain the same advantageous effects as provided by the respective corresponding preferred embodiments of the first aspect of the present invention.

To attain the object, in a third aspect of the present invention, there is provided an engine control unit including a control program for causing a computer to execute a method of controlling exhaust emissions from an internal combustion engine including an exhaust passage, an upstream catalyst that is disposed in the exhaust passage of the engine, and has an oxidation function as well as purifies exhaust gases, and a NOx catalyst that is disposed in the exhaust passage at a location downstream of the upstream catalyst, for trapping NOx contained in an oxidizing atmosphere of exhaust gases, and reducing the trapped NOx by being supplied with a reducing atmosphere of exhaust gases containing reducing agent to thereby purify the trapped NOx, wherein reduction control is carried out in which the reducing agent is supplied to an upstream side of the upstream catalyst to thereby control the exhaust gases flowing into the NOx catalyst to the reducing atmosphere so as to cause the NOx catalyst to carry out a NOx reducing operation, wherein the control program causes the computer to calculate an amount of the reducing agent in the exhaust gases consumed by the upstream catalyst during execution of the reduction control, as a reducing agent consumption amount, calculate a total amount of the reducing agent supplied to the NOx catalyst during the execution of the reduction control, as a cumulative reducing agent amount, according to the calculated reducing agent consumption amount, and terminate the reduction control when the calculated cumulative reducing agent amount exceeds a predetermined value during the execution of the reduction control.

Preferably, the engine includes an air-fuel ratio-detecting means disposed in the exhaust passage at a location upstream of the upstream catalyst, for detecting an air-fuel ratio of the exhaust gases in the exhaust passage as an actual air-fuel ratio, and the control program causes the computer to calculate the reducing agent consumption amount according to the actual air-fuel ratio.

More preferably, the control program causes the computer to switch methods for calculating the reducing agent consumption amount according to a result of comparison between the actual air-fuel ratio and the predetermined value.

Preferably, the control program causes the computer to further calculate an amount of oxygen stored in the upstream catalyst as an oxygen storage amount, and calculate the reducing agent consumption amount such that the reducing agent consumption amount takes a larger value as the calculated oxygen storage amount is larger.

Preferably, the control program causes the computer to further calculate a degree of degradation of the upstream catalyst, and correct the reducing agent consumption amount depending on the calculated degree of degradation.

With the configurations of these preferred embodiments, it is possible to obtain the same advantageous effects as provided by the respective corresponding preferred embodiments of the first aspect of the present invention.

The above and other objects, features, and advantages of the present invention will become more apparent from the following detailed description taken in conjunction with the accompanying drawings.

BRIEF DESCRIPTION OF THE DRAWINGS

FIG. 5 is a diagram showing an example of a table for use in calculating a basic value of an oxygen storage amount;

FIG. 10 is a timing chart which is useful in explaining an integral value of a second air-fuel ratio difference;

FIG. 11 is a diagram showing an example of a table for use in calculating a degree of degradation;

FIG. 15 is a timing chart showing an example of changes in a first actual air-fuel ratio and a reducing agent consumption ratio, which occur when the air-fuel ratio control process is carried out.

DETAILED DESCRIPTION OF PREFERRED EMBODIMENTS

Figure 1:
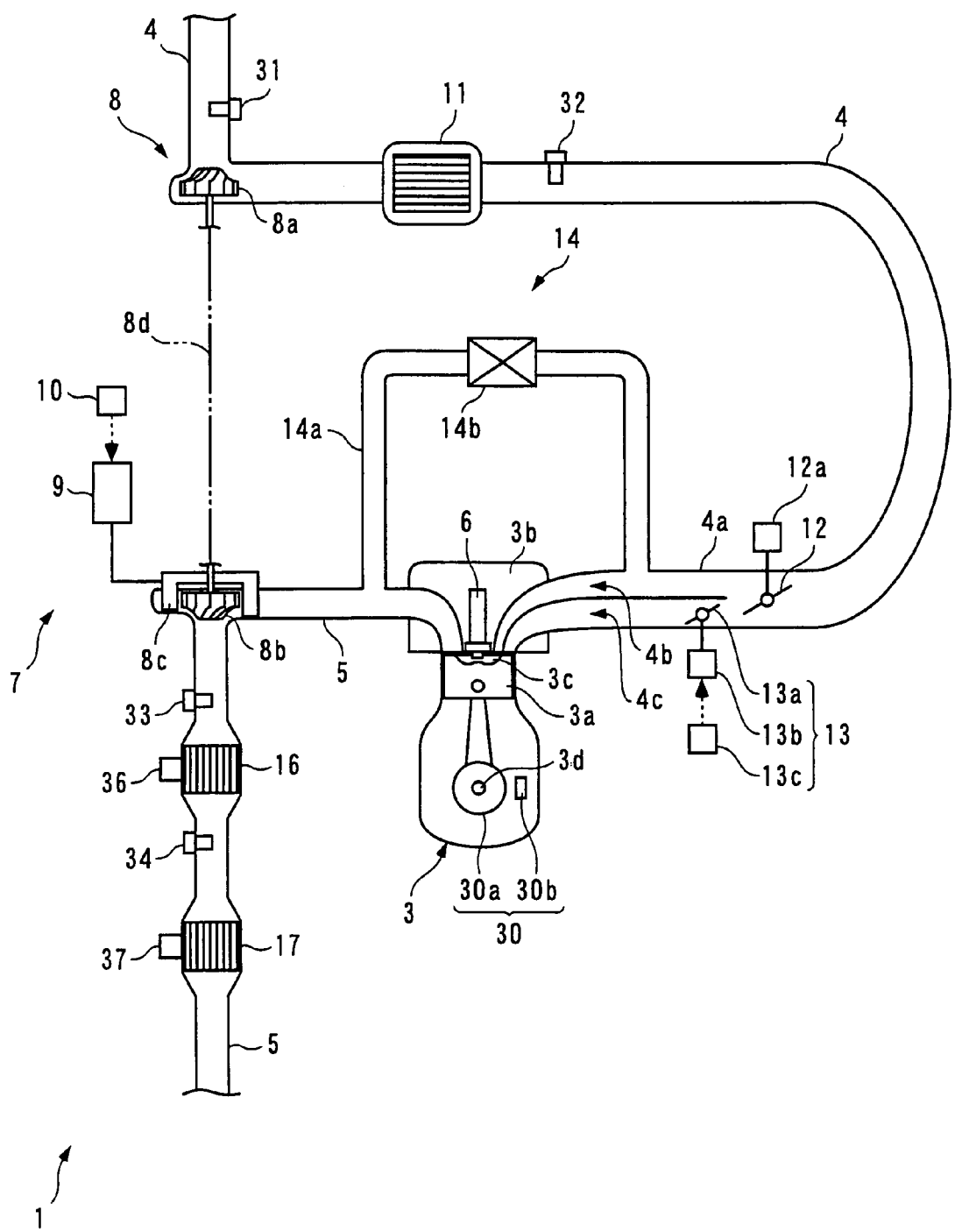
FIG. 1 is a schematic diagram of an exhaust emission control device according to an embodiment of the present invention and an internal combustion engine to which is applied the exhaust emission control device.
Figure 2:
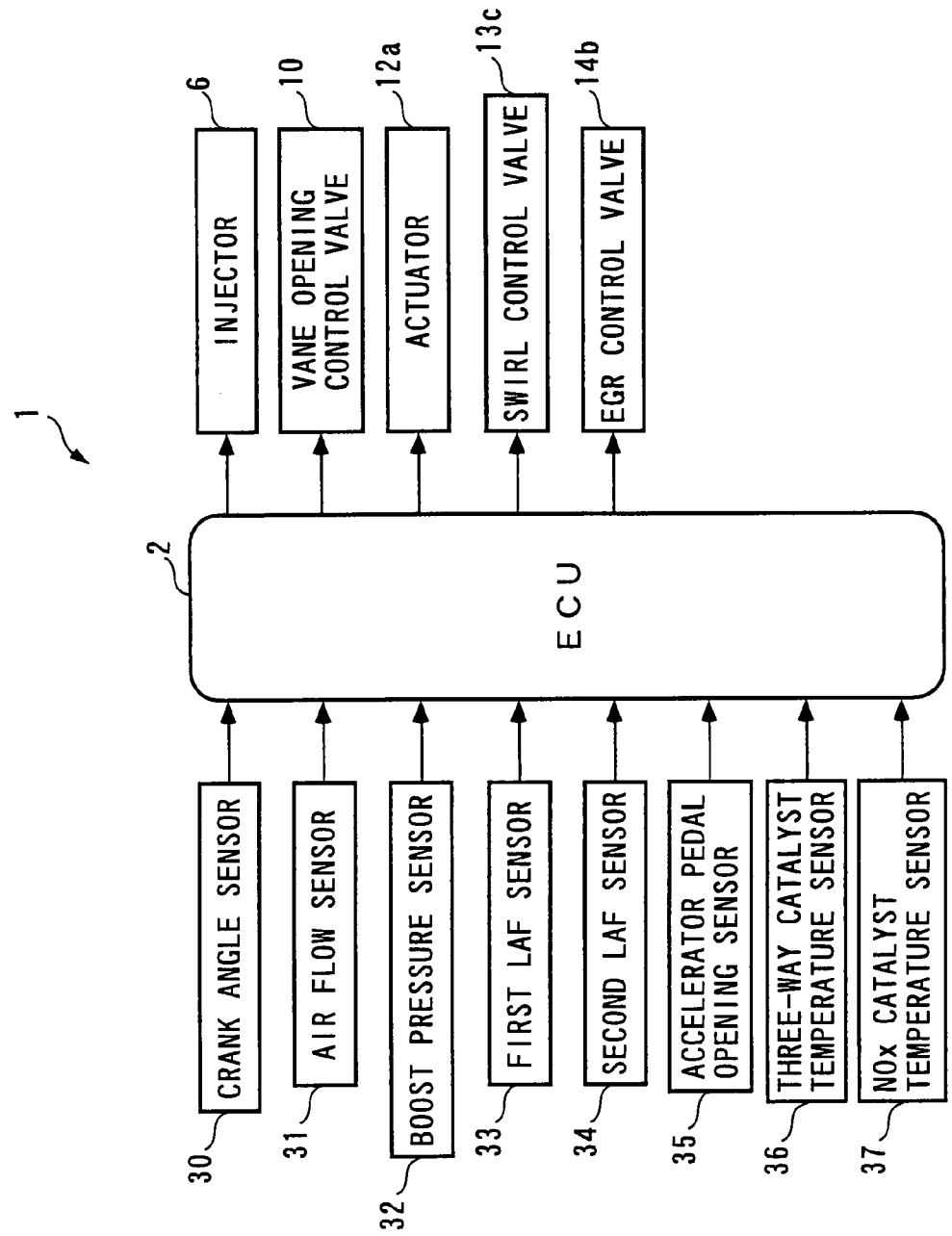
FIG. 2 is a schematic block diagram of the exhaust emission control device.

Hereafter, an exhaust emission control device according to an embodiment of the present invention will be described with reference to the drawings. FIG. 1 is a diagram showing the exhaust emission control device 1 according to the present embodiment and an internal combustion engine (hereinafter simply referred to as "the engine") 3 to which is applied the exhaust emission control device 1. As shown in FIG. 2, the exhaust emission control device 1 includes an ECU 2. As described hereinafter, the ECU 2 carries out various control processes, such as an air-fuel ratio control process, depending on operating conditions of the engine 3.

The engine 3 is an in-line four-cylinder diesel engine that includes a four pairs of cylinders and pistons 3a (only one pair of which is shown), and is installed on a vehicle, not shown. A combustion chamber 3c is defined between a piston 3a and a cylinder head 3b for each cylinder of the engine 3. The cylinder head 3b has an intake pipe 4 and an exhaust pipe 5 (exhaust passage) connected thereto, with a fuel injection valve (hereinafter referred to as "the injector") 6 mounted therethrough such that it faces the combustion chamber 3c.

The injector 6 is inserted into the combustion chamber 3c through a central portion of the top wall thereof, and is connected to a high-pressure pump and a fuel tank, neither of which is shown, in the mentioned order via a common rail. The opening and closing timings of the injector 6, i.e. a fuel injection amount TOUT and injection timing are controlled by a drive signal from the ECU 2.

A magnet rotor 30a is mounted on a crankshaft 3d of the engine 3. The magnet rotor 30a and an MRE pickup 30b form a crank angle sensor 30 which delivers a CRK signal and a TDC signal, which are both pulse signals, to the ECU 2 along with rotation of the crankshaft 3d.

Each pulse of the CRK signal is generated whenever the crankshaft 3d rotates through a predetermined crank angle (e.g. 30°). The ECU 2 calculates rotational speed (hereinafter referred to as "the engine speed") NE of the engine 3 based on the CRK signal. The TDC signal indicates that the piston 3a of each cylinder is at a predetermined crank angle position in the vicinity of the top dead center (TDC) at the start of the intake stroke thereof, and in the case of the four-cylinder engine of the illustrated example, it is delivered whenever the crankshaft 3d rotates through 180 degrees.

The intake pipe 4 has a supercharging device 7 disposed therein. The supercharging device 7 is comprised of a supercharger 8 formed by a turbo charger, an actuator 9 connected to the supercharger 8, and a vane opening control valve 10.

The supercharger 8 includes a compressor blade 8a rotatably mounted in the intake pipe 4, a rotatable turbine blade 8b and a plurality of rotatable variable vanes 8c (only two of which are shown) provided in the exhaust pipe 5, and a shaft 8d integrally formed with the two blades 8a and 8b such that the shaft 8d connects them. In the supercharger 8, as the turbine blade 8b is driven for rotation by exhaust gases flowing through the exhaust pipe 5, the compressor blade 8a integrally formed with the shaft 8d which connects between the compressor blade 8a and the turbine blade 8b is also rotated is also rotated, whereby the supercharger 8 is caused to perform a supercharging operation for pressurizing intake air in the intake pipe 4.

The actuator 9 is of a diaphragm type which is operated by negative pressure, and is mechanically connected to the respective variable vanes 8c. The actuator 9 has negative pressure supplied from a negative pressure pump, not shown, through a negative pressure supply passage, not shown. The vane opening control valve 10 is disposed in an intermediate portion of the negative pressure supply passage. The vane opening control valve 10 is formed by an electromagnetic valve, and the degree of opening thereof is controlled by a drive signal from the ECU 2, whereby negative pressure to be supplied to the actuator 9 is changed to change the degree of opening of the variable vanes 8c. Thus, boost pressure is controlled.

An intercooler 11 of a water cooling type, and a throttle valve 12 are inserted into the intake pipe 4 at respective locations downstream of the supercharger 8 from upstream to downstream in the mentioned order. The intercooler 11 is provided for carrying out an operation for cooling intake air e.g. when the temperature of the intake air is raised by the supercharging operation of the supercharging device 7. An actuator 12a is mechanically connected to the throttle valve 12. The actuator 12a is comprised e.g. of a DC motor, and is electrically connected to the CEU 2. The CEU 2 drives the actuator 12a to thereby control the opening TH of the throttle valve 12 (hereinafter referred to as "the throttle valve opening TH").

Further, the intake pipe 4 has an air flow sensor 31 inserted therein at a location upstream of the supercharger 8. The air flow sensor 31 detects an intake air amount QA (fresh air amount), to deliver a signal indicative of the sensed intake air amount QA to the ECU 2. Further, the intake pipe 4 has a boost pressure sensor 32 inserted therein between the intercooler 11 and the throttle valve 12. The boost pressure sensor 32 detects boost pressure in the intake pipe 4, to deliver a signal indicative of the sensed boost pressure to the ECU 2.

Furthermore, the intake pipe 4 has an intake manifold 4a divided into a swirl passage 4b and a bypass passage 4c between the collecting section of the intake manifold 4a and each branch portion thereof. The passages 4b and 4c communicate with the combustion chamber 3c via each intake port.

The bypass passage 4c is provided with a swirl device 13 for generating a swirl in the combustion chamber 3c. The swirl device 13 is comprised of a swirl valve 13a, an actuator 13b for actuating the swirl valve 13a to open and close the same, and a swirl control valve 13c. The actuator 13b and the swirl control valve 13c are configured similarly to the actuator 9 and the vane opening control valve 10 of the supercharging device 7, respectively. The swirl control valve 13c is connected to the above-described negative pressure pump. With this arrangement, the degree of opening of the swirl control valve 13c is controlled by a drive signal from the ECU2, whereby negative pressure supplied to the actuator 13b is changed to change the degree of opening of the swirl valve 13a, whereby the strength of the swirl is controlled.

Further, the engine 3 is provided with an EGR device 14 that has an EGR pipe 14a and an EGR control valve 14b. The EGR pipe 14a connects between the intake pipe 4 and the exhaust pipe 5. The EGR pipe 14a has one end opening in a portion of the exhaust pipe 5 at a location upstream of the turbine blade 8b, and the other end opening in a portion of the intake pipe 4 at a location downstream of the compressor blade 8a. Part of exhaust gases exhausted from the engine 3 is recirculated into the intake pipe 4 via the EGR pipe 14a as EGR gases, whereby combustion temperature in the combustion chamber 3c is lowered to decrease NOx contained in the exhaust gases.

The EGR control valve 14b is a linear solenoid valve, and is configured such that a valve lift thereof (hereinafter referred to as "the EGR lift") linearly changes between the maximum value and the minimum value according to a drive signal from the ECU 2, thereby changing the degree of opening of the EGR pipe 14a, i.e. an EGR amount. As described hereinafter, the ECU 2 controls the EGR amount via the EGR control valve 14b.

A three-way catalyst 16 and a NOx catalyst 17 are provided in the exhaust pipe 5 at respective locations downstream of the turbine blade 8b from upstream to downstream in the mentioned order. The three-way catalyst 16 (upstream catalyst) oxidizes HC and CO and performs reduction of NOx in a stoichiometric atmosphere of exhaust gases, to thereby purify i.e. decrease exhaust emissions. The three-way catalyst 16 is provided with a three-way catalyst temperature sensor 36 which detects the temperature TTWC of the three-way catalyst 16 (hereinafter referred to as "the three-way catalyst temperature TTWC"), to deliver a signal indicative of the sensed three-way catalyst temperature TTWC to the ECU 2.

When a lean atmosphere of exhaust gases flows into the NOx catalyst 17, the NOx catalyst 17 traps NOx in the exhaust gases, and when air-fuel ratio control for rich spike (hereinafter referred to as "the rich spike control"), described hereinafter, is performed to cause a rich atmosphere of exhaust gases to flow into the NOx catalyst 17, the NOx catalyst 17 performs reduction of the trapped NOx, thereby decreasing exhaust emissions. Mounted on the NOx catalyst 17 is a NOx catalyst temperature sensor 37 which detects the temperature TLNC of the NOx catalyst 17 (hereinafter referred to as "the NOx catalyst temperature TLNC") to deliver a signal indicative of the sensed NOx catalyst temperature TLNC to the ECU 2.

On the other hand, a first LAF sensor 33 and a second LAF sensor 34 are inserted into the exhaust pipe 5 in the vicinity of the three-way catalyst 16 at respective locations upstream of and downstream of the three-way catalyst 16. The first LAF sensor 33 and the second LAF sensor 34 linearly detect the concentrations of oxygen in exhaust gases, respectively, over a wide range of the air-fuel ratio ranging from a rich region to a lean region, to deliver respective signals indicative of the sensed concentrations of oxygen to the ECU 2.

The ECU 2 calculates a first actual air-fuel ratio AF1_ACT and a second actual air-fuel ratio AF2_ACT based on the signals indicative of the detected air-fuel ratios from the first LAF sensor 33 and the second LAF sensor 34, respectively. The first actual air-fuel ratio AF1_ACT represents the air-fuel ratio of exhaust gases flowing through the exhaust pipe 5 upstream of the three-way catalyst 16, while the second actual air-fuel ratio AF2_ACT represents the air-fuel ratio of exhaust gases flowing through the exhaust pipe 5 between the three-way catalyst 16 and the NOx catalyst 17. It should be noted that in the present embodiment, the first LAF sensor 33 corresponds to air-fuel ratio detecting means, and the first actual air-fuel ratio AF1_ACT corresponds to an actual air-fuel ratio.

Further, connected to the ECU 2 is an accelerator pedal opening sensor 35. The accelerator pedal opening sensor 35 detects a stepped-on amount AP of an accelerator pedal, not shown, of the vehicle (hereinafter referred to as "the accelerator pedal opening AP") and delivers a signal indicative of the sensed accelerator pedal opening AP to the ECU 2.

The ECU 2 is implemented by a microcomputer comprised of an I/O interface, a CPU, a RAM, and a ROM (none of which are specifically shown). The ECU 2 determines operating conditions of the engine 3, based on the signals from the aforementioned sensors 30 to 27, and carries out control processes, described hereinafter, such as a rich spike determining process, a degradation estimating process, and an air-fuel ratio control process, depending on operating conditions of the engine 3. The air-fuel ratio of a mixture is controlled by the above control processes such that it becomes equal to a target air-fuel ratio for lean operation (a leaner value than a stoichiometric air-fuel ratio) when normal lean operation is being performed, whereas when rich spike control is being performed, the air-fuel ratio of the mixture is controlled such that it becomes equal to a target air-fuel ratio for rich spike (a richer value than the stoichiometric air-fuel ratio) so as to reduce NOx captured by the NOx catalyst 17.

It should be noted that in the present embodiment, the ECU 2 corresponds to reduction control means, reducing agent consumption amount-calculating means, cumulative reducing agent amount-calculating means, reduction control-terminating means, air-fuel ratio-detecting means, oxygen storage amount-calculating means, degradation degree-calculating means, and correction means.

Figure 3:
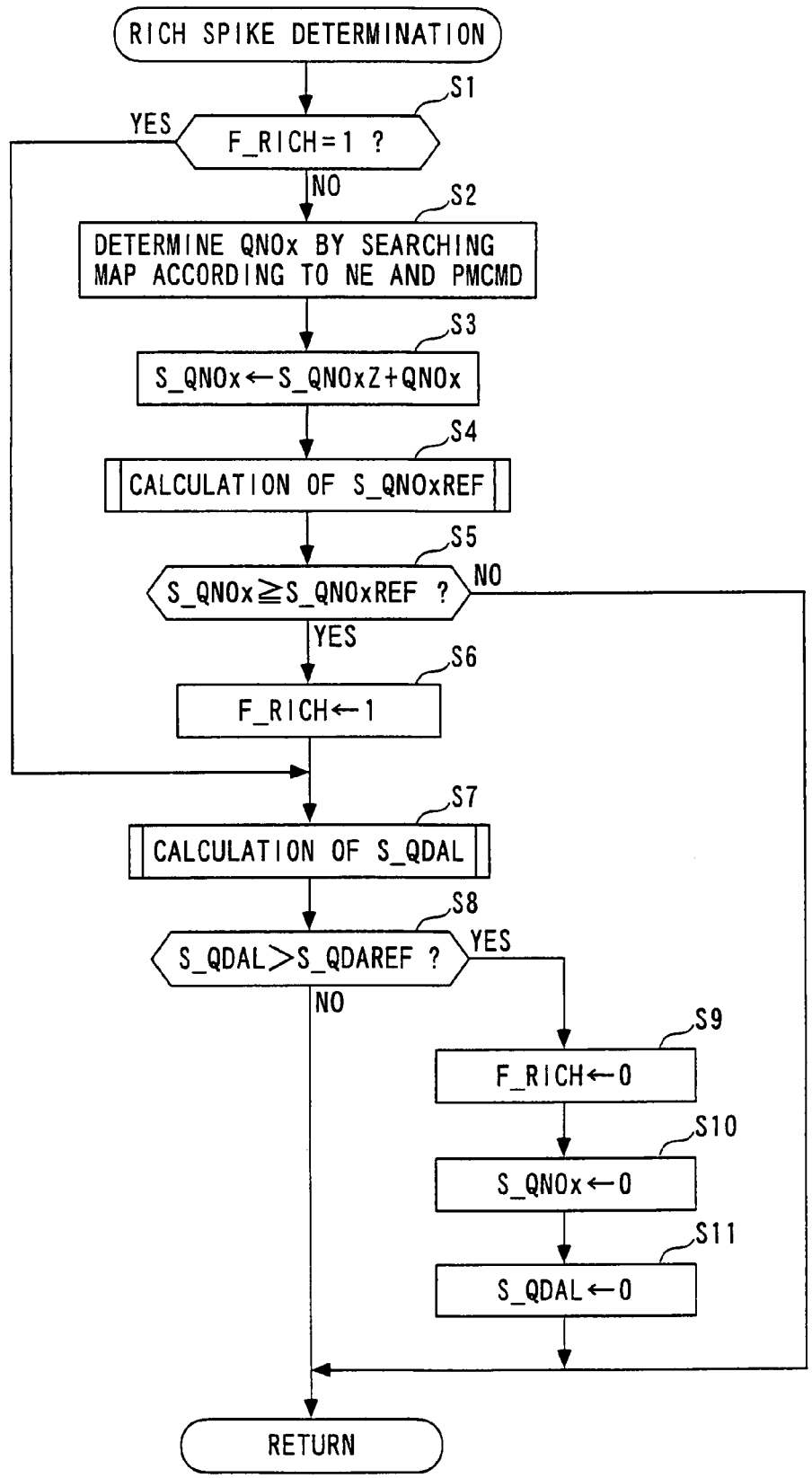
FIG. 3 is a flowchart showing a rich spike determining process.

Next, the rich spike determining process executed by the ECU 2 will be described with reference to FIG. 3. As described hereinafter, the rich spike determining process is provided for determining whether or not conditions for executing the rich spike control are satisfied, and executed at a predetermined control period (e.g. 10 msec) set by a timer. It should be noted that various values calculated or set in the following control processes are assumed to be stored in the RAM of the ECU 2.

In this process, first, in a step 1 (shown as S1 in abbreviated form in FIG. 3; the following steps are also shown in abbreviated form), it is determined whether or not a rich spike flag F_RICH is equal to 1. As described hereinafter, the rich spike flag F_RICH is set to 1 when the conditions for executing the rich spike control are satisfied.

If the answer to the question of the step 1 is negative (NO), i.e. if the lean operation is being performed, the process proceeds to a step 2, wherein the amount QNOx of emitted NOx (NOx emission amount) is calculated. More specifically, a demanded torque PMCMD is calculated by searching a map, not shown, according to the engine speed NE and the accelerator pedal opening AP, and then the NOx emission amount QNOx is calculated by searching a map, not shown, according to the demanded torque PMCMD and the engine speed NE. The NOx emission amount QNOx corresponds to the amount of NOx in exhaust gases emitted from the combustion chamber 3c to the exhaust pipe 5.

Next, in a step 3, the amount S_QNOx of trapped NOx (trapped NOx amount) is set to the sum of the immediately preceding value S_QNOxZ thereof and the NOx emission amount QNOx. The trapped NOx amount S_QNOx corresponds to the amount of NOx trapped by the NOx catalyst 17.

In a step 4 following the step 3, a reference value S_QNOxREF (predetermined value) is calculated. The reference value S_QNOxREF is calculated by a predetermined method, e.g. by searching a map, using the trapped NOx amount S_QNOx, the NOx catalyst temperature TLNC, and the space velocity SV of exhaust gases. It should be noted that the space velocity SV of exhaust gases is calculated by a predetermined method using the engine speed NE and the intake air amount QA.

Next, the process proceeds to a step 5, wherein it is determined whether or not the trapped NOx amount S_QNOx is not smaller than the reference value S_QNOxREF. If the answer to this question is negative (NO), it is determined that the trapped NOx amount S_QNOx is small, and the conditions for executing the rich spike control are not satisfied, the present process is immediately terminated.

On the other hand, if the answer to the question of the step 5 is affirmative (YES), it is determined that the conditions for executing the rich spike control are satisfied, and to indicate the fact, the process proceeds to a step 6, wherein the rich spike flag F_RICH is set to 1, followed by the process proceeding to a step 7, described hereinafter.

As described above, when the rich spike flag F_RICH is set to 1 in the step 6, in the following loops, the answer to the question of the above-described step 1 becomes affirmative (YES), and in this case, the present process proceeds to the step 7. In the step 7 following the step 1 or 6, a process for calculating the cumulative amount S_QDAL of reducing agent (cumulative reducing agent amount) is performed, as described hereinafter. The cumulative reducing agent amount S_QDAL corresponds to the total amount of reducing agent estimated to be actually supplied to the NOx catalyst 17.

Next, in a step 8, it is determined whether or not the cumulative reducing agent amount S_QDAL is larger than a predetermined reference value S_QDAREF. If the answer to this question is negative (NO), the present process is immediately terminated. On the other hand, if the answer to the question of the step 8 is affirmative (YES), it is determined that the rich spike control should be terminated to switch the rich operation to the lean operation, since NOx trapped in the NOx catalyst 17 is sufficiently reduced by reducing agent (HC and CO) in exhaust gases, and to indicate the fact, the process proceeds to a step 9, wherein the rich spike flag F_RICH is set to 0.

Next, in a step 10, the trapped NOx amount S_QNO is set to 0, and then the process proceeds to a step 11, wherein the cumulative reducing agent amount S_QDAL is set to 0, followed by terminating the present process.

Figure 4:
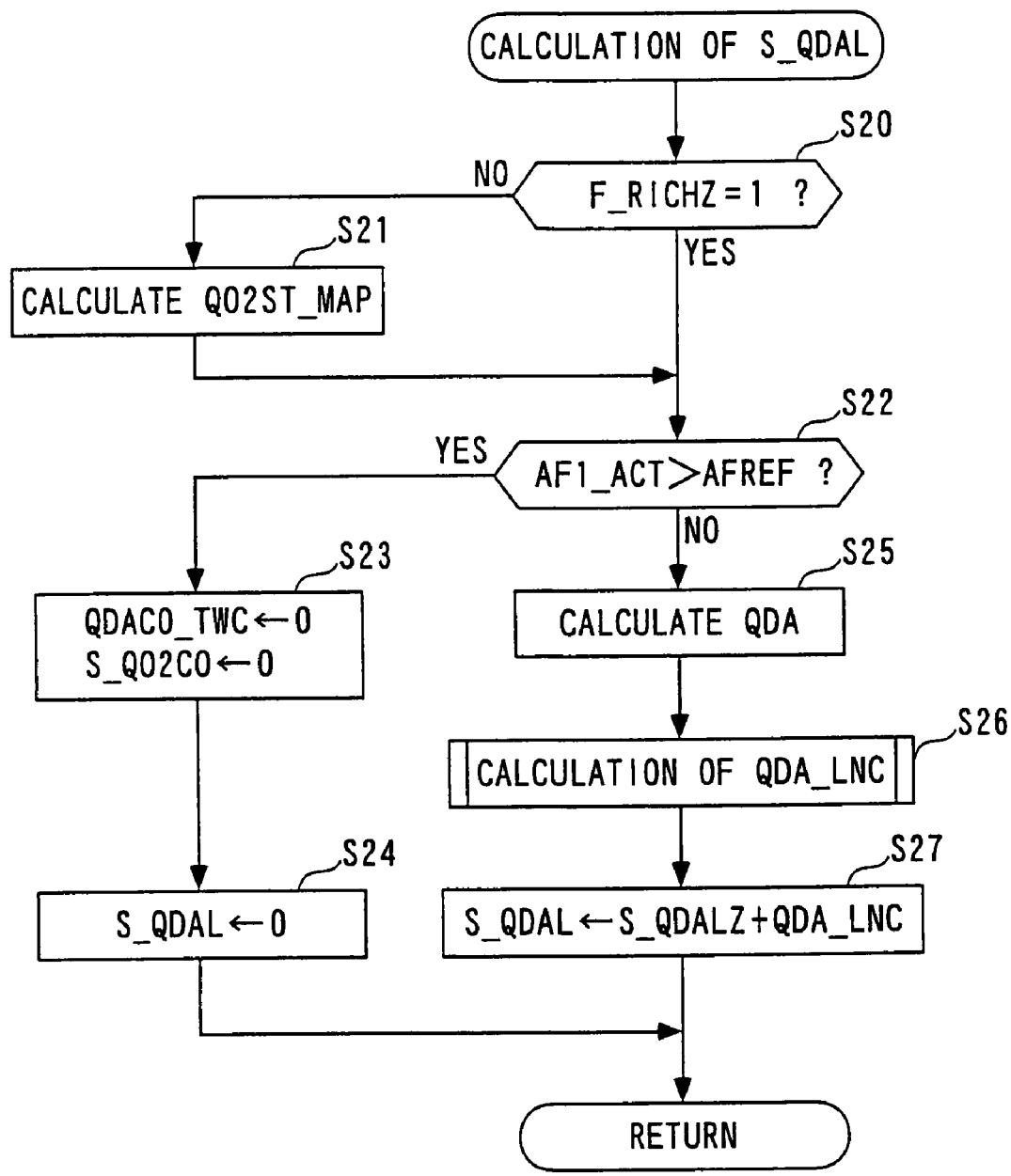
FIG. 4 is a flowchart showing a process for calculating a cumulative reducing agent amount.

Hereinafter, the aforementioned process in the step 7 for calculating the cumulative reducing agent amount S_QDAL will be described with reference to FIG. 4. As shown in FIG. 4, in this process, first, in a step 20, it is determined whether or not the immediately preceding value F_RICHZ of the rich spike flag is equal to 1. If the answer to this question is affirmative (YES), the process proceeds to a step 22, described hereinafter.

On the other hand, if the answer to the question of the step 20 is negative (NO), i.e. if the step 20 is the first control timing in which the conditions for executing the rich spike control are satisfied, the process proceeds to a step 21, wherein a basic value QO2ST_MAP of an oxygen storage amount is calculated by searching a map shown in FIG. 5 according to the three-way catalyst temperature TTWC. The basic value QO2ST_MAP of the oxygen storage amount represents the amount of oxygen that is estimated to be stored in the three-way catalyst 16 at the start of the rich spike control in a state in which the three-way catalyst 16 is not degraded.

In the FIG. 5 map, TTWC1 and TTWC2 represent predetermined values of the three-way catalyst temperature TTWC, which satisfy the relationship of TTWC1<TTWC2. In this map, the basic value QO2ST_MAP is set to a larger value as the three-way catalyst temperature TTWC is higher. This is because as the three-way catalyst temperature TTWC is higher, the degree of activation of the three-way catalyst 16 is higher and hence the oxygen-storing capability of the three-way catalyst 16 is estimated to be higher. Further, in a low temperature region of TTWC≦TTWC1, and in a high temperature region of TTWC2≦TTWC, the three-way catalyst is in a state in which the oxygen-storing capability thereof hardly changes even with a change in the three-way catalyst temperature TTWC.

In a step 22 following the step 20 or 21, it is determined whether or not the first actual air-fuel ratio AF1_ACT is higher than a predetermined reference value AFREF. The predetermined reference value AFREF (predetermined value) is set to such a value (e.g. 14.7) as will cause almost all the reducing agent in exhaust gases to be consumed by oxygen remaining in the exhaust gases when AF1_ACT>AFREF holds, and cause oxygen stored in the three-way catalyst 16, if any, to react with the reducing agent in exhaust gases when AF1_ACT≦AFREF holds.

If the answer to the question of the step 22 is affirmative (YES), it is determined that almost all the reducing agent in the exhaust gases is consumed by the oxygen remaining in the exhaust gases, and the process proceeds to a step 23, wherein a reducing agent consumption amount QDACO_TWC, referred to hereinafter, and a cumulative oxygen consumption amount S_QO2CO, referred to hereinafter, are both set to 0. Next, in a step S24, the cumulative reducing agent amount S_QDAL is set to 0, followed by terminating the present process. It should be noted that although in the above steps 23 and 24, all the three values QDACO_TWC, S_QO2CO and S_QDAL are set to 0, even if AF1_ACT>AFREF holds, a very small amount of reducing agent in exhaust gases is sometimes consumed by the three-way catalyst 16, and hence the above three values QDACO_TWC, S_QO2CO and S_QDAL may be calculated such that they become equal to minimum values, by a predetermined method (e.g. by searching a table).

On the other hand, if the answer to the question of the step 22 is negative (NO), it is determined that if oxygen is stored in the three-way catalyst 16, the oxygen is in a state in which it can be consumed by oxidation reaction with reducing agent in exhaust gases, and the process proceeds to a step 25, wherein the amount QDA of reducing agent (reducing agent amount) is calculated by the following equation (1):

$$QDA = QA \cdot (14.7 - AF1\_ACT) \qquad (1)$$

The reducing agent amount QDA corresponds to the amount of reducing agent supplied from the combustion chamber 3c into the exhaust pipe 5.

Next, the process proceeds to a step 26, wherein a reducing agent supply amount QDA_LNC is calculated. The reducing agent supply amount QDA_LNC is a value of part of the reducing agent amount QDA, which is estimated to be actually supplied to the NOx catalyst 17, and is specifically calculated as shown in FIG. 6.

Figure 6:
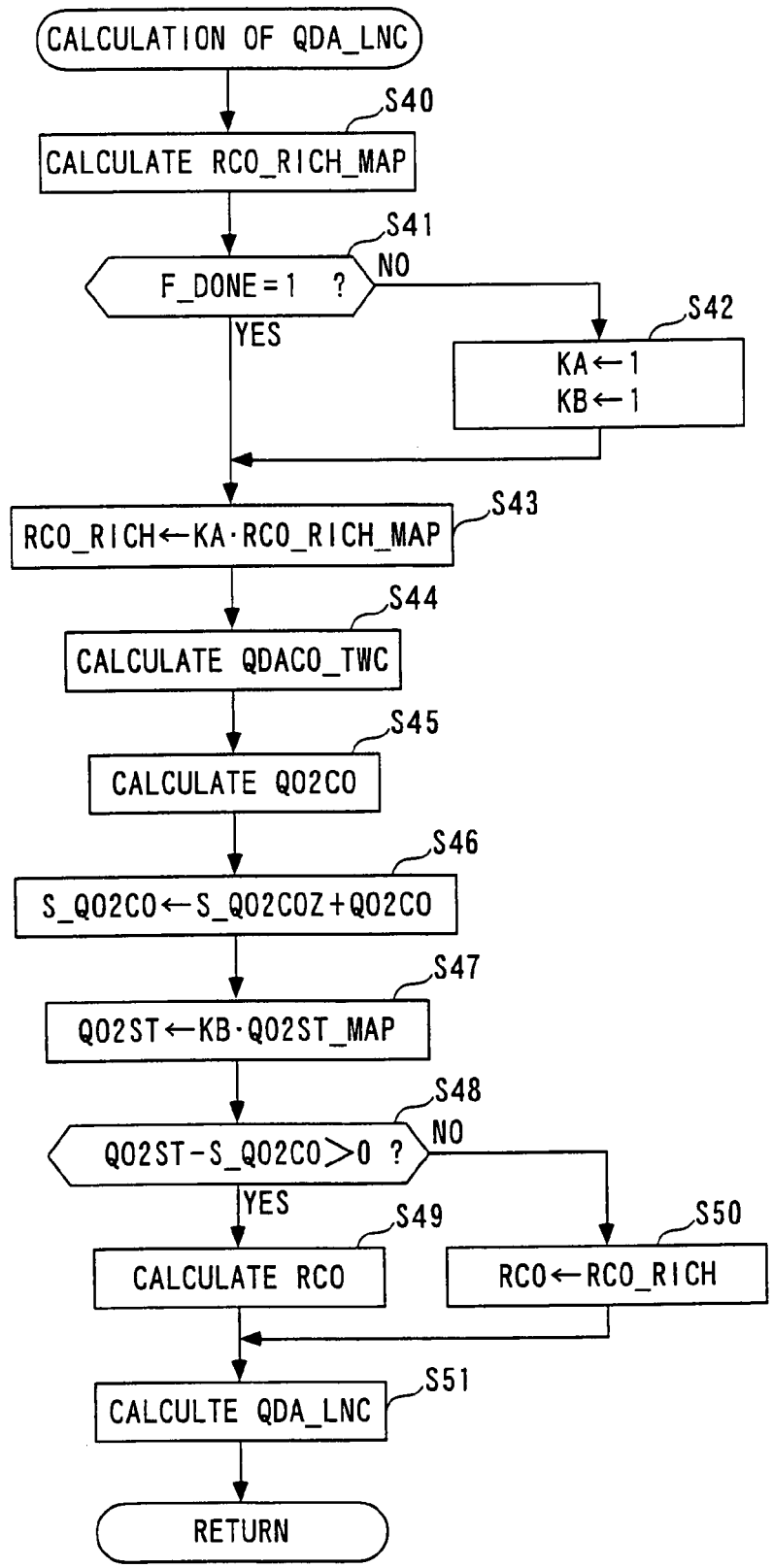
FIG. 6 is a flowchart showing a process for calculating a reducing agent supply amount.
Figure 7:
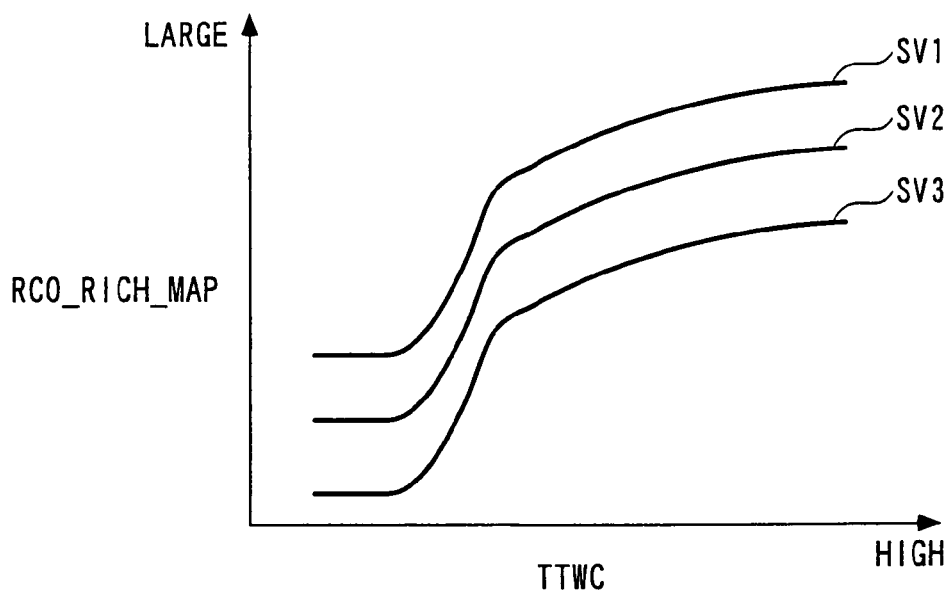
FIG. 7 is a diagram showing an example of a map for use in calculating a basic value of a steady-state reducing agent consumption ratio.

Referring to FIG. 6, first, in a step 40, the basic value RCO_RICH_MAP of a steady-state reducing agent consumption ratio is calculated by searching a map shown in FIG. 7. The basic value RCO_RICH_MAP of the steady-state reducing agent consumption ratio is used for calculating a steady-state reducing agent consumption ratio RCO_RICH occurring when the air-fuel ratio is rich, referred to hereinafter, and represents a ratio of the amount of reducing agent decreased, that is, a ratio of the amount of reducing agent consumed during the rich spike control in three-way catalyst 16, which is not degraded, in a state having released all oxygen stored therein during the lean operation by oxidation by oxygen remaining in the exhaust gases to the reducing agent amount QDA.

In FIG. 7, SV1 to SV3 represent predetermined values of the space velocity SV of exhaust gases, which satisfy the relationship of SV1<SV2<SV3. In this map, the basic value RCO_RICH_MAP is set to a larger value as the three-way catalyst temperature TTWC is higher. This is because as described above, as the three-way catalyst temperature TTWC is higher, the degree of activation of the three-way catalyst 16 is higher, whereby the ratio of the amount of reducing agent oxidized by the three-way catalyst 16 becomes higher. Further, the basic value RCO_RICH_MAP is set to a larger value as the space velocity SV of exhaust gases is lower. This is because as the space velocity SV of exhaust gases is lower, the probability of reducing agent being brought into contact with the three-way catalyst 16 becomes higher, whereby the ratio of the amount of reducing agent oxidized by the three-way catalyst 16 becomes higher.

Next, the process proceeds to a step 41, wherein it is determined whether or not a calculation completion flag F_DONE is equal to 1. The calculation completion flag F_DONE represents whether or not two degradation-dependent correction coefficients KA and KB have been calculated in a degradation estimating process, described hereinafter, for estimating the degradation of the three-way catalyst 16, in the current operating cycle of the engine 3. If the two degradation-dependent correction coefficients have been calculated, the calculation completion flag F_DONE is set to 1, and otherwise to 0.

If the answer to the question of the step 41 is affirmative (YES), the process proceeds to a step 43, described hereinafter, whereas if the answer to the question of the step 41 is negative (NO), the process proceeds to a step 42, wherein the two degradation-dependent correction coefficients KA and KB are both set to 1.

In a step 43 following the step 41 or 42, the steady-state reducing agent consumption ratio RCO_RICH occurring when the air-fuel ratio is rich is set to the product KA·RCO_RICH_MAP of the degradation-dependent correction coefficient KA and the above-described basic value RCO_RICH_MAP. As described hereinafter, the degradation-dependent correction coefficient KA is calculated such that it takes a smaller value as the degree DEGRA of degradation (degradation degree) of the three-way catalyst 16 is higher, so that when the three-way catalyst 16 is degraded, the steady-state reducing agent consumption ratio RCO_RICH occurring when the air-fuel ratio is rich is corrected by the degradation-dependent correction coefficient KA such that the steady-state reducing agent consumption ratio RCO_RICH becomes smaller as the degradation degree DEGRA of the three-way catalyst 16 is higher.

Next, the process proceeds to a step 44, wherein the reducing agent consumption amount QDACO_TWC is calculated by the following equation (2):

$$QDACO\_TWC = QDA \cdot \left(\frac{RCOZ - RCO\_RICH}{100}\right) \quad (2)$$

The reducing agent consumption amount QDACO_TWC represents an estimated value of the amount of reducing agent consumed by the three-way catalyst 16 in the current control timing. In the above equation (2), RCOZ represents the immediately preceding value of a reducing agent consumption ratio RCO calculated by an equation (3), referred to hereinafter, and the initial value of the reducing agent consumption ratio RCO is set to a predetermined value RCO_REF, described hereinafter.

Figure 8:
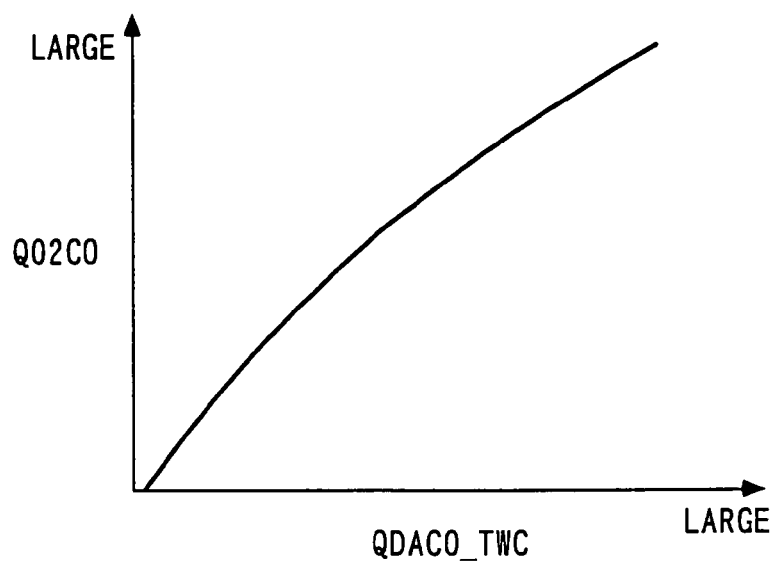
FIG. 8 is a diagram showing an example of a table for use in calculating an oxygen consumption amount.

In a step 45 following the step 44, an oxygen consumption amount QO2CO is calculated by searching a table shown in FIG. 8 according to the reducing agent consumption amount QDACO_TWC. The oxygen consumption amount QO2CO represents the consumption amount (i.e. reduction amount) of oxygen stored in the three-way catalyst 16, by oxidation reaction with reducing agent in the current control timing.

In this table, the oxygen consumption amount QO2CO is set to a larger vale as the three-way catalyst temperature TTWC is higher. This is because as described above, as the three-way catalyst temperature TTWC is higher, the degree of activation of the three-way catalyst 16 is higher, whereby the amount of oxygen consumed by oxidation reaction with reducing agent increases in the three-way catalyst 16.

Next, in a step 46, the cumulative oxygen consumption amount S_QO2CO is set to a value S_QO2COZ+QO2CO obtained by adding the oxygen consumption amount QO2CO to the immediately preceding value S_QO2COZ of the oxygen consumption cumulative amount. Then, in a step 47, the oxygen storage amount QO2ST is set to the product KB QO2ST_MAP of the degradation-dependent correction coefficient KB and the above-described basic value QO2ST_MAP thereof. As described hereinafter, the degradation-dependent correction coefficient KB is calculated such that it takes a smaller value as the degradation degree DEGRA of the three-way catalyst 16 is higher, and hence when the three-way catalyst 16 is degraded, the oxygen storage amount QO2ST is corrected by the degradation-dependent correction coefficient KB such that it becomes smaller as the degradation degree DEGRA of the three-way catalyst 16 is higher.

In a step 48 following the step 47, it is determined whether or not the difference QO2ST-S_QO2CO between the oxygen storage amount QO2ST and the cumulative oxygen consumption amount S_QO2CO is larger than 0. If the answer to this question is affirmative (YES), it is determined that oxygen is still stored in the three-way catalyst 16, and the process proceeds to a step 49, wherein the reducing agent consumption ratio RCO is calculated by the following equation:

$$RCO = RCO\_REF \cdot \alpha \cdot KA \cdot \left(1 - \frac{S\_QO2CO}{QO2ST}\right) \quad (3)$$

The reducing agent consumption ratio RCO indicates an estimated value of the ratio of reducing agent consumed by oxygen remaining in exhaust gases.

In the above equation (3), RCO_REF represents a predetermined value (e.g. 100%) of the reducing agent consumption ratio estimated to be consumed by oxygen remaining in exhaust gases during the lean operation, and $\alpha$ represents a predetermined adjustment coefficient. As mentioned hereinabove, the degradation-dependent correction coefficient KA is calculated such that it takes a smaller value as the degradation degree DEGRA of the three-way catalyst 16 is higher, so that when the three-way catalyst 16 is degraded, the reducing agent consumption ratio RCO is corrected by the degradation-dependent correction coefficient KA such that it becomes smaller as the degradation degree DEGRA of the three-way catalyst 16 is higher.

On the other hand, if the answer to the question of the step 48 is negative (NO), it is determined that no oxygen is stored in the three-way catalyst 16, and the process proceeds a step 50, wherein the reducing agent consumption ratio RCO is set to the aforementioned steady-state reducing agent consumption ratio RCO_RICH occurring when the air-fuel ratio is rich.

In a step 51 following the step 49 or 50, the reducing agent supply amount QDA_LNC is calculated by the following equation (4), followed by terminating the present process.

$$QDA\_LNC = QDA \cdot \left(1 - \frac{RCO}{100}\right) \quad (4)$$

Referring again to FIG. 4, the reducing agent supply amount QDA_LNC is calculated in the step 26, as described above, and then, the process proceeds to a step 27, wherein the cumulative reducing agent amount S_QDAL is set to the sum S_QDALZ+QDA_LNC of the immediately preceding value thereof and the reducing agent supply amount, followed by terminating the present process.

Figure 9:
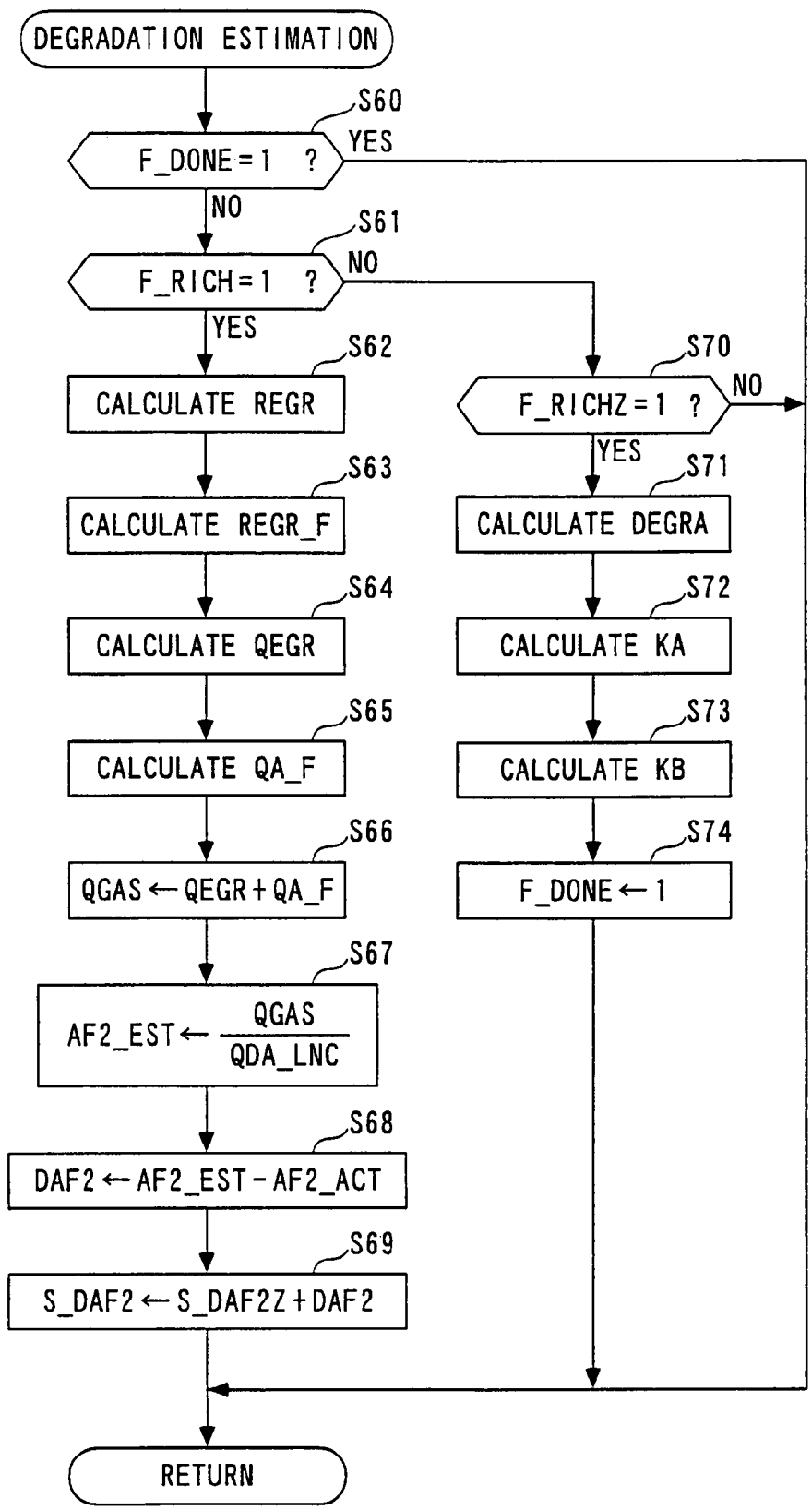
FIG. 9 is a flowchart showing a degradation estimating process.

Next, the degradation estimating process for estimating the degradation of the three-way catalyst 16 will be described with reference to FIG. 9. As described hereinafter, this process is provided for calculating the degradation degree DEGRA of the three-way catalyst 16, and calculating the aforementioned two degradation-dependent correction coefficients KA and KB based on the degradation degree DEGRA, and is executed at a predetermined control period (e.g. 10 msec) set by a timer.

In the degradation estimating process, first, in a step 60, it is determined whether or not the calculation completion flag F_DONE is equal to 1. If the answer to this question is affirmative (YES), i.e. if the two degradation-dependent correction coefficients KA and KB have already been calculated, the present process is immediately terminated.

On the other hand, if the answer to the question of the step 60 is negative (NO), i.e. if the two degradation-dependent correction coefficients KA and KB have not been calculated, the process proceeds to a step 61, wherein it is determined whether or not the rich spike flag F_RICH is equal to 1. If the answer to this question is affirmative (YES), i.e. if the rich spike control is being carried out, the process proceeds to a step 62, wherein an EGR ratio REGR is calculated by searching a table, not shown, according to a duty ratio DUTY_RICH for the rich spike. The duty ratio DUTY_RICH for the rich spike represents the duty ratio of a drive signal supplied to the EGR control valve 14b during the rich spike control, and is calculated in an air-fuel ratio control process, described hereinafter.

Next, the process proceeds to a step 63, wherein a filtered value REGR_F of the EGR ratio is calculated by a first-order lag filter equation expressed by the following equation (5):

$$REGR\_F = \beta \cdot REGR\_FZ + (1-\beta) \cdot REGR \quad (5)$$

In the above equation (5), REGR_FZ represents the immediately preceding value of the filtered value REGR_F, and β represents a predetermined filter coefficient which satisfies the relationship of 0<β<1. The filtered value REGR_F of the EGR ratio is thus used so as to cause a dead time it takes for recirculated gases to reach the combustion chamber 3c via the EGR pipe 14a, and a dead time it takes for the recirculated gases to reach the NOx catalyst 17 in the exhaust pipe 5 from the combustion chamber 3c to be reflected on the calculation of the amount of EGR gases actually supplied to the NOx catalyst 17.

In a step 64 following the step 63, the EGR amount QEGR is calculated by the following equation (6):

$$QEGR = QA \cdot \frac{REGR\_F}{1 - REGR\_F} \quad (6)$$

Next, the process proceeds to a step 65, wherein a filtered value QA_F of the intake air amount is calculated by a first-order lag filter equation expressed by the following equation (7):

$$QA\_F = \gamma \cdot QA\_FZ + (1-\gamma) \cdot QA \quad (7)$$

In the above equation (7), QA_FZ represents the immediately preceding value of the filtered value QA_F, and γ represents a predetermined filter coefficient which satisfies the relationship of 0<γ<1. The filtered value QA_F of the intake air amount is thus used so as to cause a dead time it takes for intake air to reach the combustion chamber 3c from a portion of the intake pipe 4 into which the airflow sensor is inserted, and a dead time it takes for the intake air to reach the NOx catalyst 17 in the exhaust pipe 5 from the combustion chamber 3c to be reflected on the calculation of the amount of fresh air actually supplied to the NOx catalyst 17.

Next, the process proceeds to a step 66, wherein a total gas amount QGAS is set to the sum QGAS+QA_F of the EGR amount and the filtered value of the intake air amount. The total gas amount QGAS corresponds to an estimated value of the amount of exhaust gases actually supplied to the NOx catalyst 17.

In a step 67 following the step 66, a second estimated air-fuel ratio AF2_EST is set to a value (QGAS/QDA_LNC) obtained by dividing the total gas amount QGAS by the reducing agent supply amount QDA_LNC. Then, in a step 68, a second air-fuel ratio difference DAF2 is set to the difference AF2_EST-AF2_ACT between the second estimated air-fuel ratio and the second actual air-fuel ratio.

Next, in a step 69, the integral value S_DAF2 of the second air-fuel ratio difference is set to the sum S_DAF2Z+DAF2 of the immediately preceding value thereof and the second air-fuel ratio difference, followed by terminating the present process. The process carried out in the above steps 62 to 69 corresponds to calculation of the area of a region indicated by hatching in FIG. 10.

On the other hand, if the answer to the question of the step 61 is negative (NO), the process proceeds to a step 70, wherein it is determined whether or not the immediately preceding value F_RICHZ of the rich spike flag is equal to 1. If the answer to this question is affirmative (YES), i.e. if the step 70 is the first control timing after termination of the rich spike control, the process proceeds to a step 71, wherein the degradation degree DEGRA of the three-way catalyst 16 is calculated by searching a table shown in FIG. 11 according to the integral value S_DAF2 of the second air-fuel ratio difference.

Referring to FIG. 11, the degradation degree DEGRA is set to a larger value as the integral value S_DAF2 of the second air-fuel ratio difference is larger. This is because timing in which the second actual air-fuel ratio AF2_ACT changes into a value smaller than the second estimated air-fuel ratio AF2_EST (i.e. a value on the richer side) is made earlier as the degradation degree DEGRA of the three-way catalyst 16 is larger, that is, as the oxygen-storing capability of the three-way catalyst 16 is lower.

Figure 12:
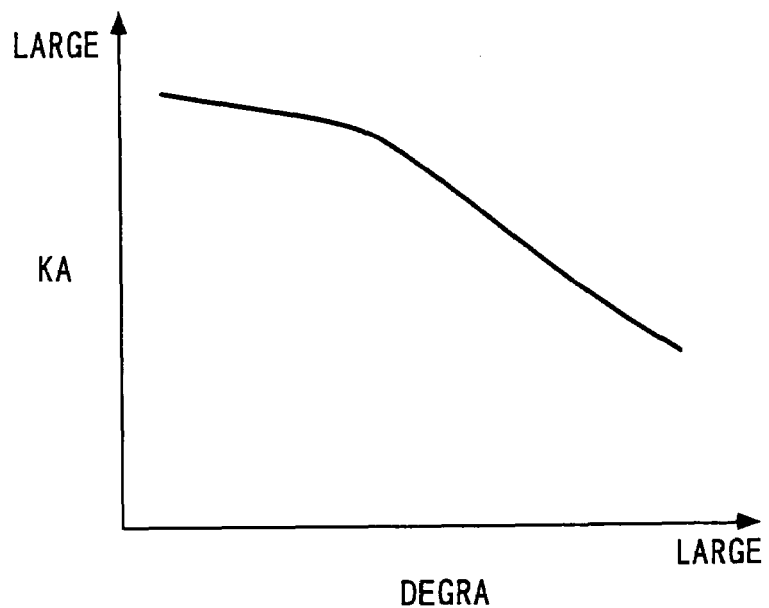
FIG. 12 is a diagram showing an example of a table for use in calculating a degradation-dependent correction coefficient for correcting the basic value of the steady-state reducing agent consumption ratio.

Next, the process proceeds to a step 72, wherein the degradation-dependent correction coefficient KA for correcting the aforementioned basic value RCO_RICH_MAP is calculated by searching a table shown in FIG. 12.

In this table, the degradation-dependent correction coefficient KA is set to a smaller value as the degradation degree DEGRA is larger. This is because as the degradation of the three-way catalyst 16 proceeds, the amount of reducing agent consumed by oxidation reaction with oxygen remaining in exhaust gases is reduced, whereby the steady-state reducing agent consumption ratio RCO_RICH occurring when the air-fuel ratio is rich takes a smaller value.

Figure 13:
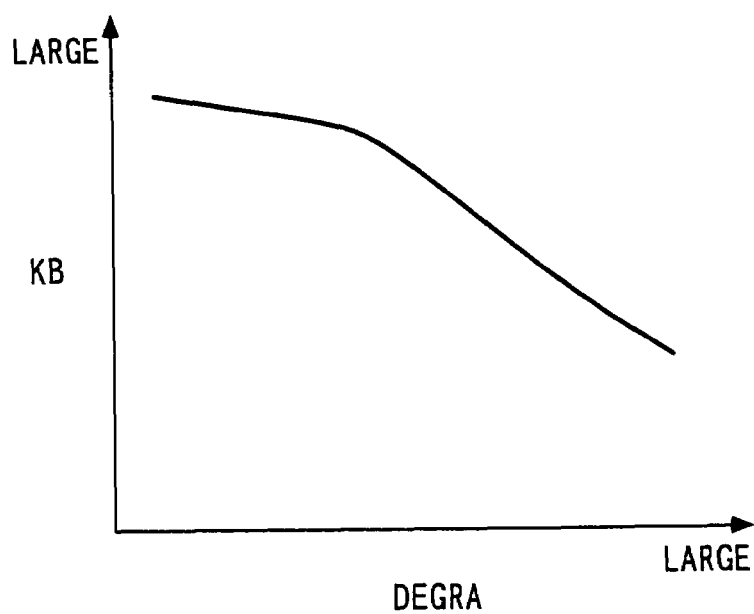
FIG. 13 is a diagram showing an example of a table for use in calculating a degradation-dependent correction coefficient for correcting the basic value of the oxygen storage amount.

Next, the process proceeds to a step 73, wherein the degradation-dependent correction coefficient KB for correcting the aforementioned basic value QO2ST_MAP is calculated by searching a table shown in FIG. 13.

In this table, similarly to the above-described degradation-dependent correction coefficient KA, the degradation-dependent correction coefficient KB is set to a smaller value as the degradation degree DEGRA is larger. This is because as the degradation of the three-way catalyst 16 proceeds, the oxygen-storing capability of the three-way catalyst 16 lowers, whereby the oxygen storage amount QO2ST takes a lower value.

In a step 74 following the step 73, to indicate that the two degradation-dependent correction coefficients KA and KB have been calculated, the calculation completion flag F_DONE is set to 1, followed by terminating the present process. As described hereinbefore, when the calculation completion flag F_DONE is set to 1, the answer to the question of the step 60 becomes affirmative (YES) in the following control timings. In this case, the present process is immediately terminated without execution of the above steps 61 to 74.

The calculation completion flag F_DONE is configured such that it is reset to 0 in an initialization process, not shown, during the start of the engine 3. Therefore, the FIG. 9 degradation estimating process described above, that is, a process for calculating the two degradation-dependent correction coefficients KA and KB is carried out only once in one driving operation cycle (one cycle from the start of the engine 3 to the stoppage thereof).

Figure 14:
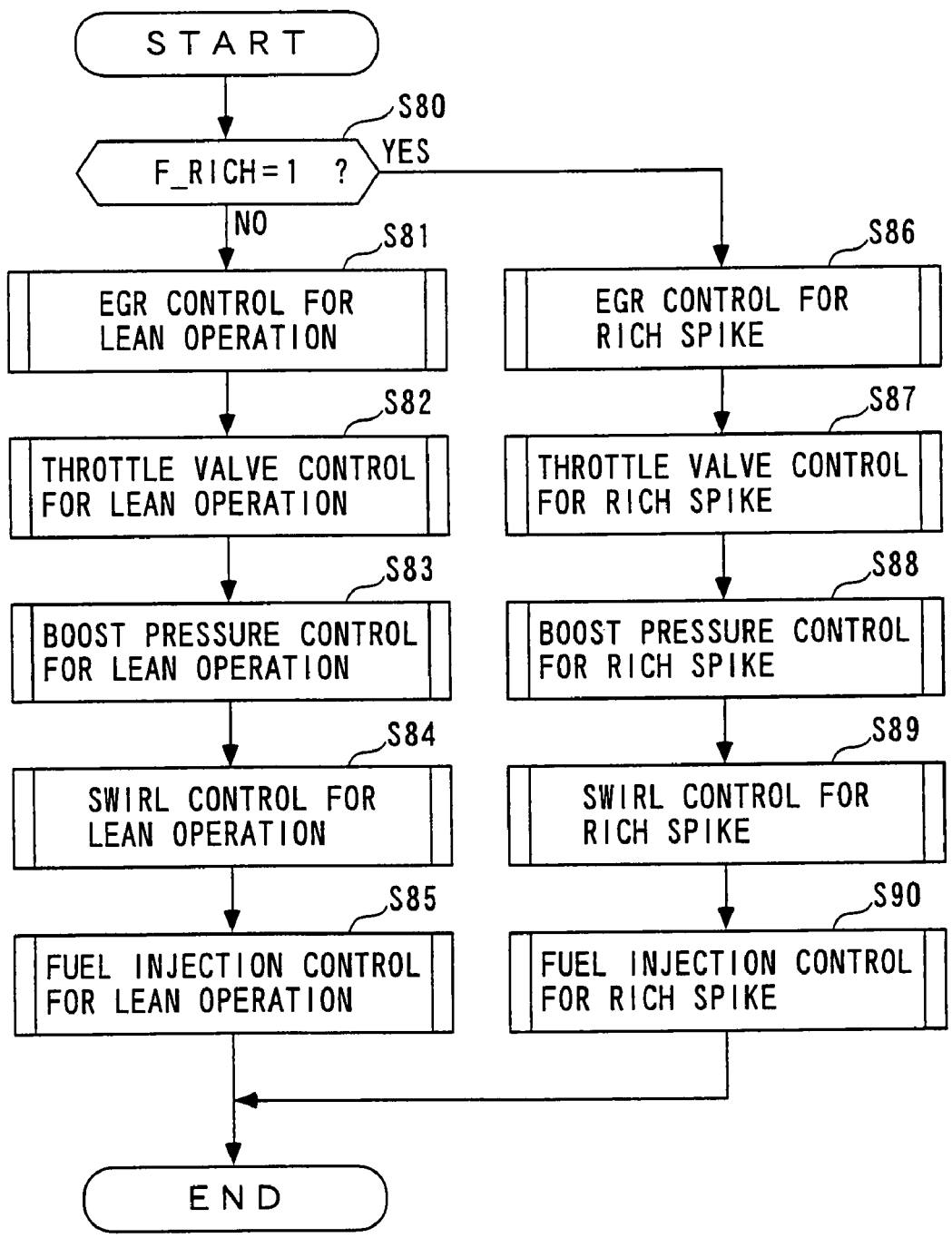
FIG. 14 is a flowchart showing an air-fuel ratio control process.

Next, the air-fuel ratio control process carried out by the ECU 2 will be described with reference to FIG. 14. As described hereinafter, this process is provided for carrying out various control processes to thereby control the air-fuel ratio of a mixture to be supplied to the combustion chamber 3c, and is executed at a predetermined control period (synchronous with generation of each TDC signal pulse).

In the air-fuel ratio control process, first, in a step 80, it is determined whether or not the aforementioned rich spike flag F_RICH is equal to 1. If the answer to this question is negative (NO), i.e. if the conditions for executing the rich spike control are not satisfied, the air-fuel ratio control process for the lean operation is carried out, as described hereinafter.

First, in a step 81, an EGR control process for the lean operation is executed. More specifically, the demanded torque PMCMD is calculated by searching a map, not shown, according to the engine speed NE and the accelerator pedal opening AP, and then a duty ratio DUTY_LEAN for the lean operation is calculated by searching a map, not shown, according to the demanded torque PMCMD and the engine speed NE. Then, a drive signal set to the duty ratio DUTY_LEAN for the lean operation is supplied to the EGR control valve 14b to thereby control the EGR amount.

Then, the process proceeds to a step 82, wherein a throttle valve control process for the lean operation is carried out. More specifically, a target throttle valve opening TH_CMD is set to a predetermined WOT (Wide-Open Throttle) value TH_WOT, and a drive signal corresponding to the target throttle valve opening TH_CMD is supplied to the actuator 12a, whereby the throttle valve 12 is controlled such that it is fully open.

Next, in a step 83, a boost pressure control process for the lean operation is performed. More specifically, a target vane opening of the variable vanes 8c for the lean operation is calculated by searching a map, not shown, according to the demanded torque PMCMD and the engine speed NE, and a drive signal corresponding to the target vane opening for the lean operation is supplied to the vane opening control valve 10, whereby boost pressure is controlled.

In a step 84 following the step 83, a swirl control process for the lean operation is carried out. More specifically, a target swirl opening of the swirl valve 13a for the lean operation is calculated by searching a map, not shown, according to the demanded torque PMCMD and the engine speed NE, and a drive signal corresponding to the target swirl opening for the lean operation is supplied to the swirl control valve 13c, whereby the swirl is controlled.

Next, the process proceeds to a step 85, wherein a fuel injection control process for the lean operation is carried out. More specifically, a basic fuel injection amount is calculated by searching a map, not shown, according to the demanded torque PMCMD and the engine speed NE, and is corrected according to various operating condition parameters, to thereby calculate a fuel injection amount for the lean operation. Next, a fuel injection start timing for the lean operation is calculated by searching a map, not shown, according to the above fuel injection amount for the lean operation and the engine speed NE. Then, the valve-opening timing and valve-closing timing of each fuel injection valve 6 are controlled based on the fuel injection amount for the lean operation and the fuel injection start timing for the lean operation, calculated as above, followed by terminating the present process.

By the air-fuel ratio control process for the lean operation, carried out in the above steps 81 to 85, the air-fuel ratio is controlled such that it becomes equal to the target air-fuel ratio for the lean operation.

On the other hand, if the answer to the question of the step 80 is affirmative (YES), i.e. if the conditions for executing the rich spike control are satisfied, a rich spike control process, i.e. the air-fuel ratio control process for the rich spike is carried out, as described hereinafter.

First, in a step 86, an EGR control process for the rich spike is executed. More specifically, first, the demanded torque PMCMD is calculated by searching a map, not shown, according to the engine speed NE and the accelerator pedal opening AP, and then a target intake air amount QARICH for the rich spike is calculated by searching a map, not shown, according to the demanded torque PMCMD and the engine speed NE. Next, a duty ratio DUTY_RICH for the rich spike is calculated with a predetermined feedback control algorithm such that the intake air amount QA converges to the target intake air amount QARICH for the rich spike. Then, a drive signal set to the above duty ratio DUTY_RICH for the rich spike is supplied to the EGR control valve 14b to thereby control the EGR amount.

Then, the process proceeds to a step 87, wherein a throttle valve control process for the rich spike is carried out. More specifically, a target throttle valve opening TH_CMD for the rich spike is calculated by searching a map, not shown, according to the demanded torque PMCMD and the engine speed NE. Then, a drive signal corresponding to the target throttle valve opening TH_CMD is supplied to the actuator 12a, whereby the throttle valve opening TH is controlled such that it becomes equal to the target throttle valve opening TH_CMD.

Next, in a step 88, a boost pressure control process for the rich spike is performed. More specifically, a target vane opening of the variable vanes 8*c* for the rich spike is calculated by searching a map, not shown, according to the demanded torque PMCMD and the engine speed NE, and a drive signal corresponding to the target vane opening for the rich spike is supplied to the vane opening control valve 10, whereby boost pressure is controlled.

In a step 89 following the step 88, a swirl control process for the rich spike is carried out. More specifically, a target swirl opening of the swirl valve 13*a* for the rich spike is calculated by searching a map, not shown, according to the demanded torque PMCMD and the engine speed NE. Then, a drive signal corresponding to the target swirl opening for the rich spike is supplied to the swirl control valve 13*c*, whereby the swirl is controlled.

Next, the process proceeds to a step 90, wherein a fuel injection control process for the rich spike is carried out. More specifically, a basic fuel injection amount is calculated by searching a map, not shown, according to the demanded torque PMCMD and the engine speed NE, and is corrected according to the operating condition parameters, to thereby calculate a fuel injection amount for the rich spike. Then, a fuel injection start timing for the rich spike is calculated by searching a map, not shown, according to the above fuel injection amount for the rich spike and the engine speed NE. Then, the valve-opening timing and valve-closing timing of each fuel injection valve 6 are controlled based on the fuel injection amount and the fuel injection start timing for the rich spike, calculated as above, followed by terminating the present process.

By the air-fuel ratio control process for the rich spike, carried out in the above steps 86 to 90, the air-fuel ratio is controlled such that it becomes equal to the target air-fuel ratio for the rich spike.

Next, a description will be given of an example of changes in the first actual air-fuel ratio AF1_ACT and the reducing agent consumption ratio RCO, which occur when the above air-fuel ratio control process is executed, with reference to FIG. 15. First, various control processes are carried out such that the target air-fuel ratio is switched from a value for the lean operation to a value for the rich spike after a time point (time t1) at which the conditions for executing the rich spike control are satisfied to set the rich spike flag F_RICH to 1. This causes the first actual air-fuel ratio AF1_ACT to be changed such that it becomes smaller (i.e. it shifts to the richer side). At this time, almost all reducing agent in exhaust gases is consumed by oxygen remaining in the exhaust gases, whereby the reducing agent consumption ratio RCO is equal to the predetermined value RCO_REF.

Then, reducing agent is consumed by oxygen stored in the three-way catalyst 16 after a time point (time t2) at which the first actual air-fuel ratio AF1_ACT has crossed the predetermined reference value AFREF, whereby the reducing agent consumption ratio RCO lowers. Subsequently, after a time point (time t3) at which all the oxygen stored in the three-way catalyst 16 has been consumed, reducing agent is consumed only by oxygen remaining in the exhaust gases, whereby the reducing agent consumption ratio RCO becomes equal to the steady-state reducing agent consumption ratio RCO_RICH occurring when the air-fuel ratio is rich.

As described above, according to the exhaust emission control device 1, to cause the NOx catalyst 17 to carry out a NOx reducing operation, the rich spike control is performed as reduction control for controlling exhaust gases flowing into the NOx catalyst 17 to the reducing atmosphere. During the rich spike control, the amount of reducing agent that is contained in exhaust gases and consumed by the three-way catalyst 16 is calculated as the reducing agent consumption amount QDACO_TWC, and depending on the reducing agent consumption amount QDACO_TWC, the total amount of reducing agent supplied to the NOx catalyst 17 is calculated as the cumulative reducing agent amount S_QDAL. Therefore, differently from the conventional exhaust emission control device, it is possible to calculate the cumulative reducing agent amount S_QDAL as the total amount of reducing agent actually supplied to the NOx catalyst 17 while causing the amount of reducing agent contained in exhaust gases and consumed by the three-way catalyst 16 to be reflected on the calculation. Further, when the thus calculated cumulative reducing agent amount S_QDAL exceeds the predetermined reference value S_QDAREF, the rich spike control is terminated, so that it is possible to supply a just enough amount of reducing agent to the NOx catalyst 17 based on the cumulative reducing agent amount S_QDAL, which is the total amount of reducing agent actually supplied to the NOx catalyst 17. This makes it possible to ensure excellent levels of exhaust emission reduction performance and fuel economy improvement performance.

Further, the reducing agent consumption amount QDACO_TWC is set to 0 when AF1_ACT>AFREF holds, and is calculated by the equations (1) and (2) according to the first actual air-fuel ratio AF1_ACT when AF1_ACT≦AFREF holds, which makes it possible to calculate the reducing agent consumption amount QDACO_TWC while causing a change in the air-fuel ratio of exhaust gases to be reflected on the calculation during the rich spike control. In addition, the method of calculating the reducing agent consumption amount QDACO_TWC is switched depending on the results of comparison between the first actual air-fuel ratio AF1_ACT and the predetermined reference value AFREF (according to the results of the determination in the step 22). This makes it possible to calculate the reducing agent consumption amount QDACO_TWC as a value which properly represents the total amount of reducing agent actually consumed by oxidation reaction with oxygen stored in the three-way catalyst 16.

Furthermore, when AF1_ACT≦AFREF holds, the reducing agent consumption amount QDACO_TWC is calculated to be a larger value as the oxygen storage amount QO2ST of the three-way catalyst 16 is larger, since the reducing agent consumption ratio RCO used for calculating the reducing agent consumption amount QDACO_TWC is calculated by the equation (3). This makes it possible to calculate the reducing agent consumption amount QDACO_TWC as a value which properly represents the total amount of reducing agent actually consumed by oxidation reaction with oxygen stored in the three-way catalyst 16 based on the oxygen storage amount QO2ST of the three-way catalyst 16.

In addition, in the case of the exhaust emission control device 1 which is provided with the three-way catalyst 16, the amount of reducing agent consumed by oxidation reaction in the three-way catalyst 16 varies with the degree of degradation of the three-way catalyst 16. However, in the present exhaust emission control device 1, the two degradation-dependent correction coefficients KA and KB are calculated according to the degradation degree DEGRA of the three-way catalyst 16, and the basic values RCO_RICH_MAP and QO2ST_MAP are corrected by the degradation-dependent correction coefficients KA and KB, respectively, whereby the steady-state reducing agent consumption ratio RCO_RICH occurring when the air-fuel ratio is rich, the oxygen storage amount QO2ST, and the reducing agent consumption ratio RCO are calculated, respectively, and using the thus calculated RCO_RICH, QO2ST and RCO values, the reducing agent consumption amount QDACO_TWC is calculated. This makes it possible to calculate the reducing agent consumption amount QDACO_TWC while causing the degradation degree DEGRA of the three-way catalyst 16 to be reflected on the calculation.

In this case, the steady-state reducing agent consumption ratio RCO_RICH occurring when the air-fuel ratio is rich, the oxygen storage amount QO2ST, and the reducing agent consumption ratio RCO are all calculated to be smaller values as the degradation degree DEGRA of the three-way catalyst 16 is larger, whereby the reducing agent consumption amount QDACO_TWC is calculated to be a smaller value as the degradation of the three-way catalyst 16 proceeds.

As described hereinabove, it is possible to accurately calculate the reducing agent consumption amount QDACO_TWC, thereby making it possible to accurately calculate the cumulative reducing agent amount S_QDAL. As a consequence, it is possible to supply reducing agent to the NOx catalyst 17 with higher accuracy, which makes it possible to decrease exhaust emissions and improve fuel economy.

It should be noted that although in the present embodiment, the rich spike control is carried out as the reduction control, by way of example, the reduction control according to the present invention is not limited to this, but any suitable reduction control may be performed insofar as it can control exhaust gases flowing into the NOx catalyst to the reducing atmosphere. For example, for the reduction control, a fuel injection valve for supplying reducing agent may be disposed in the exhaust pipe 5, for directly injecting fuel from the fuel injection valve into the exhaust pipe 5 to thereby control exhaust gases flowing into the NOx catalyst to the reducing atmosphere.

Further, although in the above-described embodiment, the exhaust emission control device according to the present invention is applied to a diesel engine as an internal combustion engine, by way of example, this is not limitative, but it may be applied not only to the diesel engine according to the above-described embodiment but also to any suitable internal combustion engines. For example, the exhaust emission control device according to the present invention may be applied to a gasoline engine. In addition, the exhaust emission control device according to the present invention may be applied not only to the diesel engine installed on a vehicle but also to various types of internal combustion engines including engines for ship propulsion machines.

Furthermore, although in the above-described embodiment, the three-way catalyst 16 is used as an upstream catalyst, by way of example, the upstream catalyst according to the present invention is not limited to this, but any suitable upstream catalyst may be used insofar as it has an oxidation function.

It is further understood by those skilled in the art that the foregoing are preferred embodiments of the invention, and that various changes and modifications may be made without departing from the spirit and scope thereof.

What is claimed is:

1. An exhaust emission control device for an internal combustion engine, including:
   an upstream catalyst that is disposed in an exhaust passage of the engine, and has an oxidation function as well as purifies exhaust gases,
   a NOx catalyst that is disposed in the exhaust passage at a location downstream of said upstream catalyst, for trapping NOx contained in an oxidizing atmosphere of exhaust gases, and reducing the trapped NOx by being supplied with a reducing atmosphere of exhaust gases containing reducing agent to thereby purify the trapped NOx, and
   reduction control means for carrying out reduction control in which the reducing agent is supplied to an upstream side of said upstream catalyst to thereby control the exhaust gases flowing into said NOx catalyst to the reducing atmosphere so as to cause said NOx catalyst to carry out a NOx reducing operation,
   wherein said reduction control means comprises:
   reducing agent consumption amount-calculating means for calculating an amount of the reducing agent in the exhaust gases consumed by said upstream catalyst during execution of the reduction control, as a reducing agent consumption amount;
   cumulative reducing agent amount-calculating means for calculating a total amount of the reducing agent supplied to said NOx catalyst during the execution of the reduction control, as a cumulative reducing agent amount, according to the calculated reducing agent consumption amount; and
   reduction control-terminating means for terminating the reduction control when the calculated cumulative reducing agent amount exceeds a predetermined value during the execution of the reduction control.

2. An exhaust emission control device as claimed in claim 1, further comprising air-fuel ratio-detecting means disposed in the exhaust passage at a location upstream of said upstream catalyst, for detecting an air-fuel ratio of the exhaust gases in the exhaust passage as an actual air-fuel ratio, and
   wherein said reducing agent consumption amount-calculating means calculates the reducing agent consumption amount according to the actual air-fuel ratio.

3. An exhaust emission control device as claimed in claim 2, wherein said reducing agent consumption amount-calculating means switches methods for calculating the reducing agent consumption amount according to a result of comparison between the actual air-fuel ratio and the predetermined value.

4. An exhaust emission control device as claimed in claim 1, wherein said reducing agent consumption amount-calculating means further comprises oxygen storage amount-calculating means for calculating an amount of oxygen stored in said upstream catalyst as an oxygen storage amount, and calculates the reducing agent consumption amount such that the reducing agent consumption amount takes a larger value as the calculated oxygen storage amount is larger.

5. An exhaust emission control device as claimed in claim 1, wherein said reducing agent consumption amount-calculating means further comprises degradation degree-calculating means for calculating a degree of degradation of said upstream catalyst, and correction means for correcting the reducing agent consumption amount depending on the calculated degree of degradation.

6. A method of controlling exhaust emissions from an internal combustion engine including an exhaust passage, an upstream catalyst that is disposed in the exhaust passage of the engine, and has an oxidation function as well as purifies exhaust gases, and a NOx catalyst that is disposed in the exhaust passage at a location downstream of the upstream catalyst, for trapping NOx contained in an oxidizing atmosphere of exhaust gases, and reducing the trapped NOx by being supplied with a reducing atmosphere of exhaust gases containing reducing agent to thereby purify the trapped NOx, wherein reduction control is carried out in which the reducing agent is supplied to an upstream side of the upstream catalyst to thereby control the exhaust gases flowing into the NOx catalyst to the reducing atmosphere so as to cause the NOx catalyst to carry out a NOx reducing operation, the method comprising:

a reducing agent consumption amount-calculating step of calculating an amount of the reducing agent in the exhaust gases consumed by the upstream catalyst during execution of the reduction control, as a reducing agent consumption amount;

a cumulative reducing agent amount-calculating step of calculating a total amount of the reducing agent supplied to the NOx catalyst during the execution of the reduction control, as a cumulative reducing agent amount, according to the calculated reducing agent consumption amount; and a reduction control-terminating step of terminating the reduction control when the calculated cumulative reducing agent amount exceeds a predetermined value during the execution of the reduction control.

7. A method as claimed in claim 6, wherein the engine includes an air-fuel ratio-detecting means disposed in the exhaust passage at a location upstream of said upstream catalyst, for detecting an air-fuel ratio of the exhaust gases in the exhaust passage as an actual air-fuel ratio, and wherein said reducing agent consumption amount-calculating step include calculating the reducing agent consumption amount according to the actual air-fuel ratio.

8. A method as claimed in claim 7, wherein said reducing agent consumption amount-calculating step includes switching methods for calculating the reducing agent consumption amount according to a result of comparison between the actual air-fuel ratio and the predetermined value.

9. A method as claimed in claim 6, wherein said reducing agent consumption amount-calculating step further comprises an oxygen storage amount-calculating step of calculating an amount of oxygen stored in the upstream catalyst as an oxygen storage amount, and includes calculating the reducing agent consumption amount such that the reducing agent consumption amount takes a larger value as the calculated oxygen storage amount is larger.

10. A method as claimed in claim 6, wherein said reducing agent consumption amount-calculating step further comprises a degradation degree-calculating step of calculating a degree of degradation of said upstream catalyst, and a correction step of correcting the reducing agent consumption amount depending on the calculated degree of degradation.

11. An engine control unit including a control program for causing a computer to execute a method of controlling exhaust emissions from an internal combustion engine including an exhaust passage, an upstream catalyst that is disposed in the exhaust passage of the engine, and has an oxidation function as well as purifies exhaust gases, and a NOx catalyst that is disposed in the exhaust passage at a location downstream of the upstream catalyst, for trapping NOx contained in an oxidizing atmosphere of exhaust gases, and reducing the trapped NOx by being supplied with a reducing atmosphere of exhaust gases containing reducing agent to thereby purify the trapped NOx, wherein reduction control is carried out in which the reducing agent is supplied to an upstream side of the upstream catalyst to thereby control the exhaust gases flowing into the NOx catalyst to the reducing atmosphere so as to cause the NOx catalyst to carry out a NOx reducing operation, wherein the control program causes the computer to calculate an amount of the reducing agent in the exhaust gases consumed by the upstream catalyst during execution of the reduction control, as a reducing agent consumption amount, calculate a total amount of the reducing agent supplied to the NOx catalyst during the execution of the reduction control, as a cumulative reducing agent amount, according to the calculated reducing agent consumption amount, and terminate the reduction control when the calculated cumulative reducing agent amount exceeds a predetermined value during the execution of the reduction control.

12. An engine control unit as claimed in claim 11, wherein the engine includes an air-fuel ratio-detecting means disposed in the exhaust passage at a location upstream of said upstream catalyst, for detecting an air-fuel ratio of the exhaust gases in the exhaust passage as an actual air-fuel ratio, and wherein the control program causes the computer to calculate the reducing agent consumption amount according to the actual air-fuel ratio.

13. An engine control unit as claimed in claim 12, wherein the control program causes the computer to switch methods for calculating the reducing agent consumption amount according to a result of comparison between the actual air-fuel ratio and the predetermined value.

14. An engine control unit as claimed in claim 11, wherein the control program causes the computer to further calculate an amount of oxygen stored in the upstream catalyst as an oxygen storage amount, and calculate the reducing agent consumption amount such that the reducing agent consumption amount takes a larger value as the calculated oxygen storage amount is larger.

15. An engine control unit as claimed in claim 11, wherein the control program causes the computer to further calculate a degree of degradation of said upstream catalyst, and correct the reducing agent consumption amount depending on the calculated degree of degradation.

* * * * *